(12) United States Patent
Segapelli et al.

(10) Patent No.: US 11,070,738 B2
(45) Date of Patent: Jul. 20, 2021

(54) INFRARED-ASSISTED PRE-FLASH

(71) Applicant: QUALCOMM Incorporated, San Diego, CA (US)

(72) Inventors: Loic Francois Segapelli, San Diego, CA (US); Ho Sang Lee, San Diego, CA (US); Ying Noyes, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/591,543

(22) Filed: Oct. 2, 2019

(65) Prior Publication Data

US 2021/0105392 A1    Apr. 8, 2021

(51) Int. Cl.
  *H04N 5/235*    (2006.01)
  *H04N 5/33*    (2006.01)
  *G03B 7/097*    (2021.01)
  *G03B 15/05*    (2021.01)
  *G03B 7/17*    (2021.01)

(52) U.S. Cl.
  CPC .......... *H04N 5/2354* (2013.01); *G03B 7/097* (2013.01); *G03B 7/17* (2015.01); *G03B 15/05* (2013.01); *H04N 5/2351* (2013.01); *H04N 5/33* (2013.01)

(58) Field of Classification Search
  CPC ...... H04N 5/2354; H04N 5/33; H04N 5/2351; G03B 15/05; G03B 7/17; G03B 7/097
  See application file for complete search history.

(56) References Cited

U.S. PATENT DOCUMENTS

| | | | |
|---|---|---|---|
| 2013/0155253 A1* | 6/2013 | Wood | H04N 5/2354 348/164 |
| 2016/0377708 A1* | 12/2016 | Lou | G01S 17/894 348/221.1 |
| 2018/0191879 A1* | 7/2018 | Evans, V | G03B 13/20 |
| 2020/0036914 A1* | 1/2020 | Van Der Sijde | H04N 5/23212 |
| 2020/0068127 A1* | 2/2020 | Au | G06F 21/74 |

\* cited by examiner

*Primary Examiner* — Padma Haliyur
(74) *Attorney, Agent, or Firm* — Qualcomm Incorporated

(57) ABSTRACT

Methods, systems, and devices for operating a camera-enabled device are described. The camera-enabled device may emit, via a first light emitting source, an infrared light in a physical environment and determine time-of-flight information associated with a target object in the physical environment based on the emitted infrared light. The camera-enabled device may estimate one or more exposure settings based on the time-of-flight information, and emit, via a second light emitting source, a visible light in the physical environment based on the estimated one or more exposure settings. As a result, the camera-enabled device may capture an image of the physical environment based on the emitted visible light and the estimated one or more exposure settings.

20 Claims, 11 Drawing Sheets

INFRARED-ASSISTED PRE-FLASH

FIELD OF TECHNOLOGY

The following relates generally to operating a camera-enabled device and more specifically to infrared-assisted pre-flash capture sequence.

BACKGROUND

Multimedia systems are widely deployed to provide various types of multimedia communication content such as voice, video, packet data, messaging, broadcast, and so on. These multimedia systems may be capable of processing, storage, generation, manipulation and rendition of multimedia information. Examples of multimedia systems include camera systems, entertainment systems, information systems, virtual reality systems, model and simulation systems, and so on. These systems may employ a combination of hardware and software technologies to support processing, storage, generation, manipulation and rendition of multimedia information, for example, such as capture devices, storage devices, communication networks, computer systems, and display devices.

SUMMARY

The described techniques relate to improved methods, systems, devices, and apparatuses that support infrared-assisted pre-flash. Generally, the described techniques provide for reducing a pre-flash duration in a pre-capture sequence by using time-of-flight information. As part of a pre-capture sequence, a camera-enabled device may use a pre-flash to assist in estimating capture settings. The pre-flash, however, may have undesirable effects on the camera-enabled device, such as reduced battery life due to a length of time of the pre-flash. Use of a pre-flash may also cause discomfort to the subject of a photograph. Techniques for reducing the pre-flash duration are therefore desired.

A device may include one or more time-of-flight sensors capable of emitting or detecting invisible or nearly visible light, such as infrared radiation (IR) light, for example, light having a wavelength of approximately 850 nanometers (nm). In capturing an image of a target object, the device may perform a pre-capture sequence (e.g., before a pre-flash using a visible light source), during which the device may emit IR light via the time-of-flight sensors and determine time-of-flight information based on IR light reflected by the target object. Using the time-of-flight information, for example, the device may determine (e.g., estimate) a first set of capture settings (e.g., a focus setting, an exposure estimate) before using a pre-flash. In some examples, by using the time-of-flight information to determine the capture settings, the device may reduce an amount of time for operating the pre-flash. By using the time-of-flight information to determine the set of capture settings before a pre-flash, the device may reduce the amount of time needed for the pre-flash.

A method of operating a camera-enabled device is described. The method may include emitting, via a first light emitting source of the camera-enabled device, an infrared light in a physical environment, determining time-of-flight information associated with a target object in the physical environment based on the emitted infrared light, estimating one or more exposure settings based on the time-of-flight information, emitting, via a second light emitting source of the camera-enabled device, a visible light in the physical environment based on the estimated one or more exposure settings, and capturing an image of the physical environment based on the emitted visible light and the estimated one or more exposure settings.

An apparatus is described. The apparatus may include a processor, memory coupled with the processor, and instructions stored in the memory. The instructions may be executable by the processor to cause the apparatus to emit, via a first light emitting source of the apparatus, an infrared light in a physical environment, determine time-of-flight information associated with a target object in the physical environment based on the emitted infrared light, estimate one or more exposure settings based on the time-of-flight information, emit, via a second light emitting source of the apparatus, a visible light in the physical environment based on the estimated one or more exposure settings, and capture an image of the physical environment based on the emitted visible light and the estimated one or more exposure settings.

Another apparatus is described. The apparatus may include means for emitting, via a first light emitting source of the apparatus, an infrared light in a physical environment, determining time-of-flight information associated with a target object in the physical environment based on the emitted infrared light, estimating one or more exposure settings based on the time-of-flight information, emitting, via a second light emitting source of the apparatus, a visible light in the physical environment based on the estimated one or more exposure settings, and capturing an image of the physical environment based on the emitted visible light and the estimated one or more exposure settings.

A non-transitory computer-readable medium storing code for operating a camera-enabled device is described. The code may include instructions executable by a processor to emit, via a first light emitting source of the camera-enabled device, an infrared light in a physical environment, determine time-of-flight information associated with a target object in the physical environment based on the emitted infrared light, estimate one or more exposure settings based on the time-of-flight information, emit, via a second light emitting source of the camera-enabled device, a visible light in the physical environment based on the estimated one or more exposure settings, and capture an image of the physical environment based on the emitted visible light and the estimated one or more exposure settings.

Some examples of the method, apparatuses, and non-transitory computer-readable medium described herein may further include operations, features, means, or instructions for comparing the estimated one or more exposure settings to one or more default exposure settings, configuring the camera-enabled device with the estimated one or more exposure settings based on the comparing, where capturing the image of the physical environment may be further based on configuring the camera-enabled device with the estimated one or more exposure settings.

Some examples of the method, apparatuses, and non-transitory computer-readable medium described herein may further include operations, features, means, or instructions for enabling the first light emitting source of the camera-enabled device during a first period, where emitting the infrared light in the physical environment may be based on the enabling, determining a first illumination level associated with the physical environment based on the emitted infrared light during the first period, where determining the time-of-flight information associated with the target object in the physical environment may be further based on the first illumination level.

Some examples of the method, apparatuses, and non-transitory computer-readable medium described herein may further include operations, features, means, or instructions for disabling the first light emitting source of the camera-enabled device during a second period different than the first period based on the first illumination level satisfying a threshold, determining a second illumination level associated with the physical environment based on the disabling, where determining the time-of-flight information associated with the target object in the physical environment may be further based on one or more of the first illumination level or the second illumination level.

Some examples of the method, apparatuses, and non-transitory computer-readable medium described herein may further include operations, features, means, or instructions for determining an illumination level associated with the physical environment based on the emitted infrared light, determining a distance between the camera-enabled device and the target object in the physical environment based on the time-of-flight information, enabling the second light emitting source of the camera-enabled device based on one or more of the illumination level and the distance between the camera-enabled device and the target object, where emitting, via the second light emitting source of the camera-enabled device, the visible light in the physical environment may be further based on the enabling.

Some examples of the method, apparatuses, and non-transitory computer-readable medium described herein may further include operations, features, means, or instructions for pre-configuring an auto focus setting of the camera-enabled device based on one or more of the illumination level and the distance between the camera-enabled device and the target object, where emitting, via the second light emitting source of the camera-enabled device, the visible light in the physical environment may be further based on the preconfigured auto focus setting.

Some examples of the method, apparatuses, and non-transitory computer-readable medium described herein may further include operations, features, means, or instructions for enabling, a third light emitting source of the camera-enabled device, based on the distance between the camera-enabled device and the target object in the physical environment satisfying a threshold, emitting, via the third light emitting source of the camera-enabled device, a second visible light in the physical environment based on the enabling, where capturing the image of the physical environment may be further based on the emitted second visible light.

In some examples of the method, apparatuses, and non-transitory computer-readable medium described herein, the emitted visible light associated with the second light emitting source may have a lower luminance level compared to the emitted second visible light associated with the third light emitting source.

In some examples of the method, apparatuses, and non-transitory computer-readable medium described herein, one or more of the first light emitting source, the second light emitting source, or the third light emitting source may be part of a same component the camera-enabled device.

Some examples of the method, apparatuses, and non-transitory computer-readable medium described herein may further include operations, features, means, or instructions for emitting, via the second light emitting source of the camera-enabled device, the visible light includes emitting the visible light according to a first power level.

Some examples of the method, apparatuses, and non-transitory computer-readable medium described herein may further include operations, features, means, or instructions for emitting, via the third light emitting source of the camera-enabled device, the second visible light includes emitting the second visible light according to a second power level different than the first power level.

Some examples of the method, apparatuses, and non-transitory computer-readable medium described herein may further include operations, features, means, or instructions for overriding, a third light emitting source of the camera-enabled device, based on the distance between the camera-enabled device and the target object in the physical environment satisfying a threshold, where capturing the image of the physical environment may be further based on the overriding.

Some examples of the method, apparatuses, and non-transitory computer-readable medium described herein may further include operations, features, means, or instructions for estimating one or more white balance settings of the camera-enabled device based on one or more of the emitted infrared light or the emitted visible light, where capturing the image of the physical environment may be further based on the estimated one or more white balance settings.

In some examples of the method, apparatuses, and non-transitory computer-readable medium described herein, one or more of the first light emitting source or the second light emitting source includes a time-of-flight sensor.

In some examples of the method, apparatuses, and non-transitory computer-readable medium described herein, the first light emitting source and the second light emitting source may be within a footprint of the camera-enabled device.

In some examples of the method, apparatuses, and non-transitory computer-readable medium described herein, the first light emitting source and the second light emitting source may be part of a same component of the camera-enabled device.

DETAILED DESCRIPTION

Flash photography is widely used today in camera-enabled devices to improve image quality. By using a flash unit to increase an amount of light at a time an image is taken, a user can capture a well-lit image despite an otherwise dark or poorly lit scene. For example, using a flash unit may enable the user to take images under low lighting conditions and in a wider variety of locations with varying lighting conditions. Use of a flash unit may also be useful for taking portrait images under lighting conditions where the amount of light may be insufficient for otherwise capturing a clear image of a subject. Additionally, the use of a flash may also improve the ability of a camera-enabled device to capture images of moving objects under various lighting conditions.

To further improve image quality, camera-enabled devices (e.g., smart phones) may enable a pre-capture sequence to estimate capture settings before image capture using a first flash, which may be a main flash (e.g., a primary flash or a default flash of the camera-enabled device). Examples of capture settings include auto focus and auto exposure control. During the pre-capture sequence, the camera-enabled devices may use a pre-flash sequence to improve the estimation of capture settings, for example by using a flash unit of the camera to emit light at low power. In some examples, the use of the pre-flash sequence may have undesirable effects on the camera-enabled device, such as reduced battery life due to a length of time of the pre-flash. Use of this pre-flash may also cause discomfort to the subject of a photograph during the pre-flash sequence, for example, when capturing a portrait image. To reduce discomfort and improve battery life, some camera-enabled devices may incorporate additional sensors, such as light sensors to address the timing issue with the pre-flash. However, such techniques may lack capabilities to further reduce the length of the pre-flash sequence.

For example, digital single-lens reflex (DSLR) cameras may include additional light sensors. DSLR cameras may use a shutter to expose the light sensors along with the capture medium (e.g., SLR: film, DSLR: sensor) with the opening and closing of the shutter. Once the light sensors have "filled up" with photons, the light sensors may take control of the shutter and close it. Although generally effective, devices configured with additional sensors may lack capabilities to further reduce the length of the pre-flash sequence. Reducing the pre-flash duration would reduce discomfort caused to subjects of photographs and improve battery life of camera-enabled devices, and thus improved techniques for achieving a reduced pre-flash duration are desired.

Aspects of the disclosure are initially described in the context of wireless communications systems. Aspects of the disclosure are further illustrated by and described with reference to apparatus diagrams, system diagrams, and flowcharts that relate to infrared-assisted pre-flash.

Figure 1:
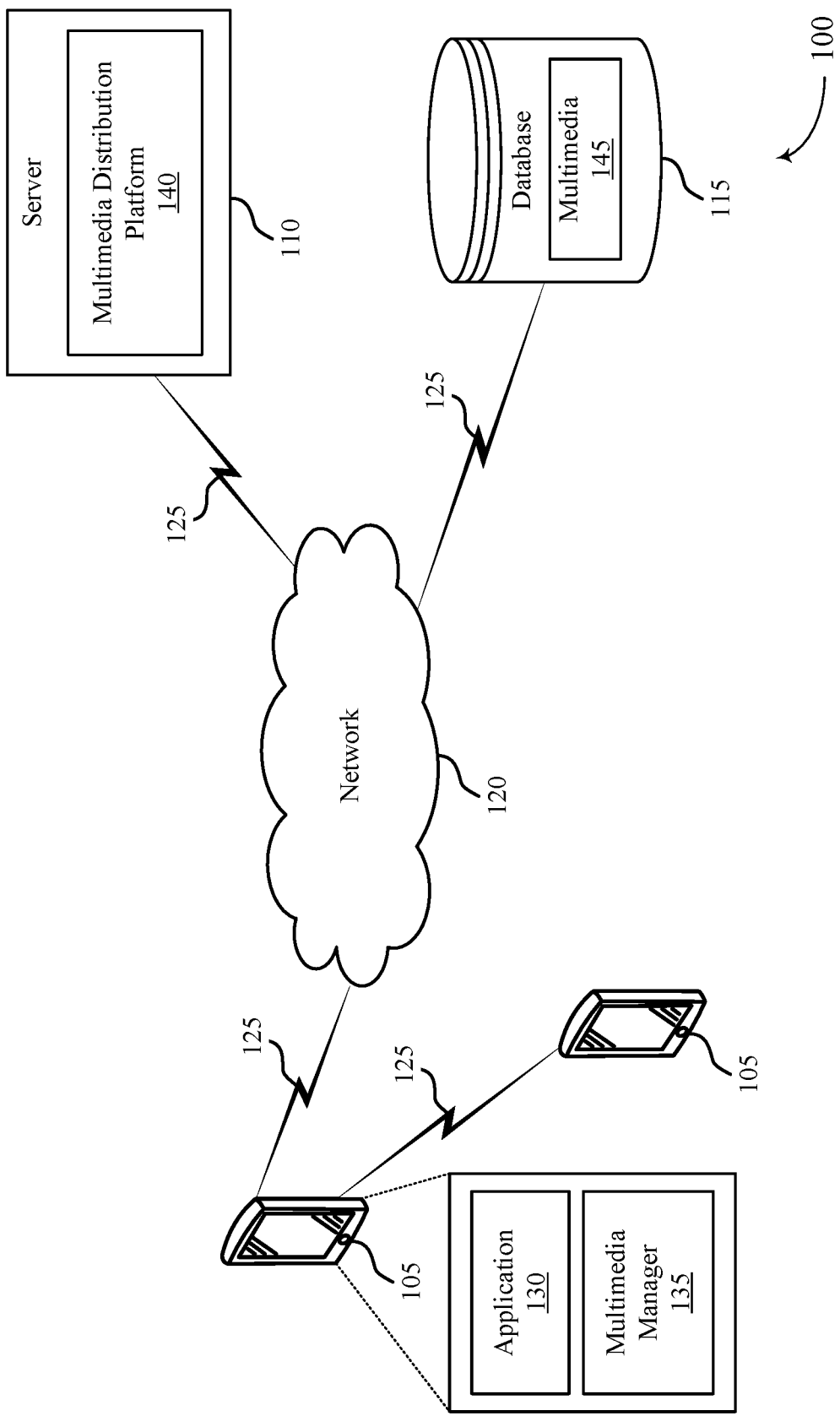
FIG. 1 illustrates an example of a multimedia system compatible with operating a camera-enabled device that supports infrared-assisted pre-flash in accordance with aspects of the present disclosure.

FIG. 1 illustrates an example of a multimedia system 100 compatible with operating a camera-enabled device that supports infrared-assisted pre-flash in accordance with aspects of the present disclosure. The multimedia system 100 may include devices 105 (e.g., camera-enabled devices), a server 110, and a database 115. Although, the multimedia system 100 illustrates two devices 105, a single server 110, a single database 115, and a single network 120, the present disclosure applies to any multimedia system architecture having one or more devices 105, servers 110, databases 115, and networks 120. The devices 105, the server 110, and the database 115 may communicate with each other and exchange information that supports infrared-assisted pre-flash, such as multimedia packets, multimedia data, or multimedia control information, via network 120 using communications links 125. In some cases, a portion or all of the techniques described herein supporting infrared-assisted pre-flash may be performed by the devices 105 or the server 110, or both.

A device 105 may be a standalone camera, a non-standalone camera, an enabled-camera device, for example, such as a cellular phone, a smartphone, a personal digital assistant (PDA), a wireless communication device, a handheld device, a tablet computer, a laptop computer, a cordless phone, a display device (e.g., monitors), and/or the like that supports various types of communication and functional features related to multimedia (e.g., transmitting, receiving, broadcasting, streaming, sinking, capturing, storing, and recording multimedia data). The device 105 may be capable of connecting to the multimedia system 100 via wired or wireless communications, but aspects of the device 105 are not limited thereto. For example, aspects of the device 105 as described herein may be performed with or without wired or wireless communications to another device 105, the servers 110, the databases 115, or the networks 120. For example, the device 105 may be a camera-enabled device supportive of infrared-assisted preflash, without wireless network capabilities. In another example, the device 105 may be a camera-enabled device supportive of infrared-assisted preflash, with wireless network capabilities, where the described aspects supportive of infrared-assisted pre-flash may be performed without enabling the wireless network capabilities. The device 105 may be an example of aspects of the device 505 described herein. A device 105 may, additionally or alternatively, be referred to by those skilled in the art as a user equipment (UE), a user device, a smartphone, a Bluetooth device, a Wi-Fi device, a mobile station, a subscriber station, a mobile unit, a subscriber unit, a wireless unit, a remote unit, a mobile device, a wireless device, a wireless communications device, a remote device, an access terminal, a mobile terminal, a wireless terminal, a remote terminal, a handset, a user agent, a mobile client, a client, and/or some other suitable terminology. In some cases, the devices 105 may also be able to communicate directly with another device (e.g., using a peer-to-peer (P2P) or device-to-device (D2D) protocol). For example, a device 105 may be able to receive from or transmit to another device 105 variety of information, such as instructions or commands (e.g., multimedia-related information).

The devices 105 may include an application 130 and a multimedia manager 135. While, the multimedia system 100 illustrates the devices 105 including both the application 130 and the multimedia manager 135, the application 130 and the multimedia manager 135 may be an optional feature for the devices 105. In some cases, the application 130 may be a multimedia-based application that can receive (e.g., download, stream, broadcast) from the server 110, database 115 or another device 105, or transmit (e.g., upload) multimedia data to the server 110, the database 115, or to another device 105 via using communications links 125.

The multimedia manager 135 may be part of a general-purpose processor, a digital signal processor (DSP), an image signal processor (ISP), a central processing unit (CPU), a graphics processing unit (GPU), a microcontroller, an application-specific integrated circuit (ASIC), a field-programmable gate array (FPGA), a discrete gate or transistor logic component, a discrete hardware component, or any combination thereof, or other programmable logic device, discrete gate or transistor logic, discrete hardware components, or any combination thereof designed to perform the functions described in the present disclosure, and/or the like. For example, the multimedia manager 135 may process multimedia (e.g., image data, video data, audio data) from and/or write multimedia data to a local memory of the device 105 or to the database 115.

The multimedia manager 135 may also be configured to provide multimedia enhancements, multimedia restoration, multimedia analysis, multimedia compression, multimedia streaming, and multimedia synthesis, among other functionality. For example, the multimedia manager 135 may perform white balancing, cropping, scaling (e.g., multimedia compression), adjusting a resolution, multimedia stitching, color processing, multimedia filtering, spatial multimedia filtering, artifact removal, frame rate adjustments, multimedia encoding, multimedia decoding, and multimedia filtering. By further example, the multimedia manager 135 may process multimedia data to support infrared-assisted pre-flash, according to the techniques described herein.

For example, the multimedia manager 135 may emit, via a first light emitting source of the device 105, an infrared light (e.g., having a wavelength of about 850 nm) in a physical environment, and determine time-of-flight information associated with a target object in the physical environment based on the emitted infrared light. In some examples, the multimedia manager 135 may estimate one or more exposure settings based on the time-of-flight information. The multimedia manager 135 may emit, via a second light emitting source of the device 105, a visible light (e.g., having a wavelength of about 340 nm to about 740 nm) in the physical environment based on the estimated one or more exposure settings. In some examples, the multimedia manager 135 may capture an image of the physical environment based on the emitted visible light and the estimated one or more exposure settings. The multimedia manager 135 may be an example of aspects of the multimedia manager 515 described herein.

The server 110 may be a data server, a cloud server, a server associated with a multimedia subscription provider, proxy server, web server, application server, communications server, home server, mobile server, or any combination thereof. The server 110 may in some cases include a multimedia distribution platform 140. The multimedia distribution platform 140 may allow the devices 105 to discover, browse, share, and download multimedia via network 120 using communications links 125, and therefore provide a digital distribution of the multimedia from the multimedia distribution platform 140. As such, a digital distribution may be a form of delivering media content such as audio, video, images, without the use of physical media but over online delivery mediums, such as the Internet. For example, the devices 105 may upload or download multimedia-related applications for streaming, downloading, uploading, processing, enhancing, etc. multimedia (e.g., images, audio, video). The server 110 may also transmit to the devices 105 a variety of information, such as instructions or commands (e.g., multimedia-related information) to download multimedia-related applications on the device 105.

The database 115 may store a variety of information, such as instructions or commands (e.g., multimedia-related information). For example, the database 115 may store multimedia 145. The device may support infrared-assisted pre-flash associated with the multimedia 145. The device 105 may retrieve the stored data from the database 115 via the network 120 using communication links 125. In some examples, the database 115 may be a relational database (e.g., a relational database management system (RDBMS) or a Structured Query Language (SQL) database), a non-relational database, a network database, an object-oriented database, or other type of database, that stores the variety of information, such as instructions or commands (e.g., multimedia-related information).

The network 120 may provide encryption, access authorization, tracking, Internet Protocol (IP) connectivity, and other access, computation, modification, and/or functions. Examples of network 120 may include any combination of cloud networks, local area networks (LAN), wide area networks (WAN), virtual private networks (VPN), wireless networks (using 802.11, for example), cellular networks (using third generation (3G), fourth generation (4G), long-term evolved (LTE), or new radio (NR) systems (e.g., fifth generation (5G)), etc. Network 120 may include the Internet.

The communications links 125 shown in the multimedia system 100 may include uplink transmissions from the device 105 to the server 110 and the database 115, and/or downlink transmissions, from the server 110 and the database 115 to the device 105. The communications links 125 may transmit bidirectional communications and/or unidirectional communications. In some examples, the communication links 125 may be a wired connection or a wireless connection, or both. For example, the communications links 125 may include one or more connections, including but not limited to, Wi-Fi, Bluetooth, Bluetooth low-energy (BLE), cellular, Z-WAVE, 802.11, peer-to-peer, LAN, wireless local area network (WLAN), Ethernet, FireWire, fiber optic, and/or other connection types related to wireless communication systems.

The techniques described herein may provide improvements in estimating exposure settings for capturing an image, reducing a pre-flash duration, and increasing battery life. Furthermore, the techniques described herein may provide benefits and enhancements to the operation of the devices 105. For example, by pre-estimating exposure settings for capturing an image, and thus reducing dependencies on a pre-flash for configuring a main sensor exposure for image capture, the operational characteristics, such as power consumption, processor utilization (e.g., DSP, CPU, GPU, ISP processing utilization), and memory usage of the devices 105 may be reduced. The techniques described herein may also provide a shortened pre-flash duration, such that the devices 105 experience improved efficiency due to reduced latency associated with processes related to infrared-assisted pre-flash.

Figure 2:
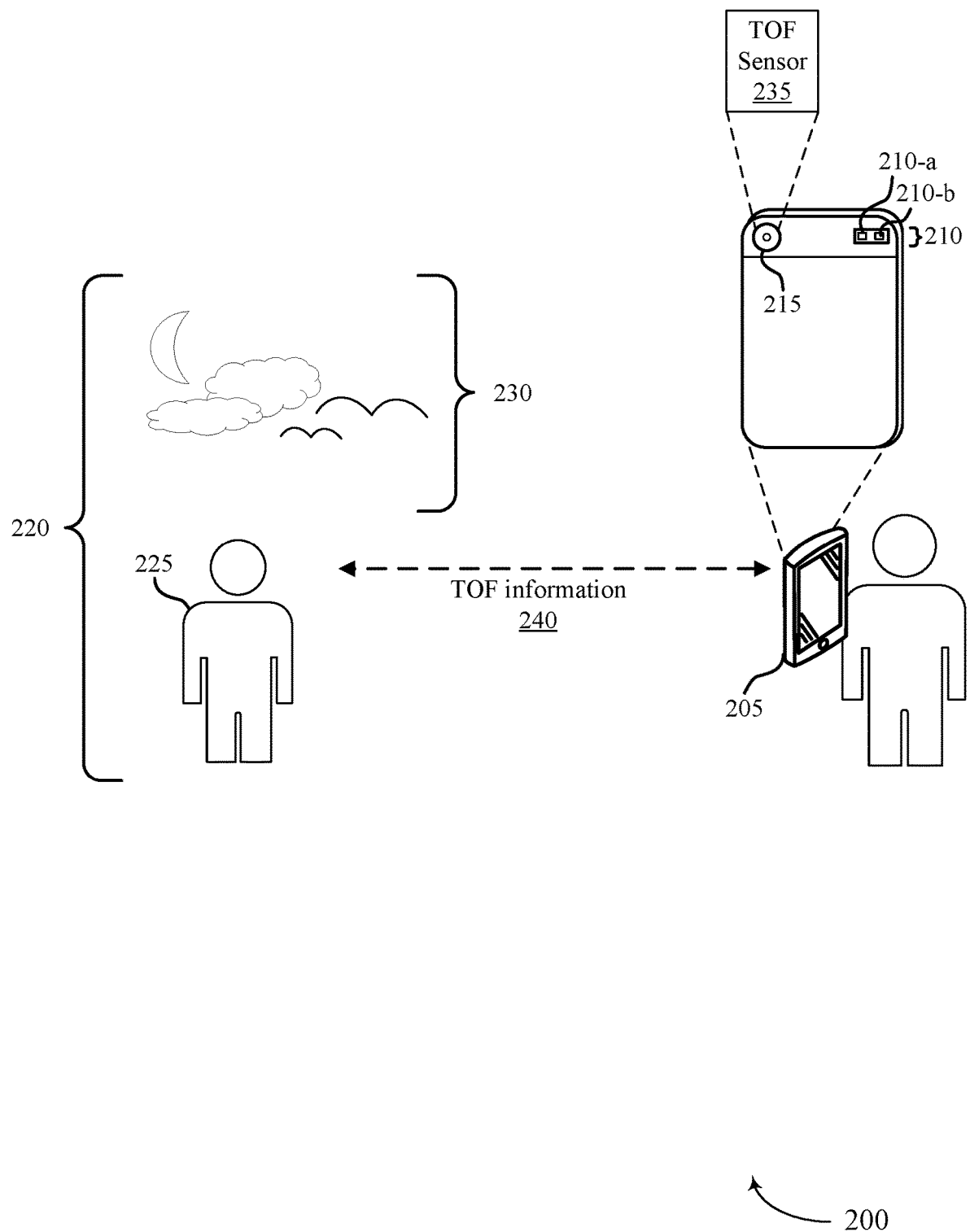
FIG. 2 illustrates an example of a multimedia system that supports infrared-assisted pre-flash in accordance with aspects of the present disclosure.

FIG. 2 illustrates an example of a multimedia system 200 that supports infrared-assisted pre-flash in accordance with aspects of the present disclosure. The multimedia system 200 may implement aspects of the multimedia system 100. The multimedia system 200 may be, for example, an image capture system, a camera imaging system, among other examples that supports image capturing techniques (e.g., a pre-flash, a main flash, a lighting, a light filtering, or an autofocus technique) and image processing techniques in accordance with aspects of the present disclosure. The multimedia system 200 may include a device 205 (e.g., a camera-enabled device) that includes a light source 210 and a sensor 215.

In some examples, a user may use the device 205 to capture an image of a scene 220 (e.g., including a target object 225) using the light source 210 and the sensor 215 of the device 205. The device 205 may utilize the light source 210 and the sensor 215, according to techniques described herein, to capture an image, a sequence of images, a video stream, etc. of the target object 225 or the scene 220. As an example, the device 205 may utilize the light source 210 and the sensor 215 to illuminate the target object 225 or the scene 220, adjust one or more settings (e.g., an autofocus setting, an exposure setting, an auto exposure setting, a white balance setting) associated with capturing an image of the target object 225 or the scene 220 according to lighting conditions 230 (e.g., daytime, nighttime, cloudy, low light), and capture an image of the target object 225 or the scene 220.

The device 205 may, in some examples, employ the light source 210 and the sensor 215 to capture and generate one or more images of the target object 225 or the scene 220. The light source 210 may include light sources capable of emitting visible light or invisible light. In an example, the light source 210 may include a light source 210-a capable of emitting visible light and a light source 210-b capable of emitting invisible or nearly visible light (e.g., an IR light, a near-IR light, an ultraviolet (UV) light). The sensor 215 may be a camera including phase detection pixels, non-phase detection pixels, and a filter. The sensor 215 may also include one or more time-of-flight sensors 235 capable of detecting visible, invisible, or nearly visible light.

In some examples, the device 205 may emit light (e.g., an IR light) from the light source 210 (e.g., the light source 210-b) and, using the time-of-flight sensors 235, determine time-of-flight information 240 associated with the target object 225 in the physical environment (e.g., the scene 220) based on the emitted infrared light. The device 105 may estimate exposure settings based on the time-of-flight information 240. In some examples, the device 105 may emit, via the light source 210 (e.g., the light source 210-a), a visible light in the physical environment based on the estimated exposure settings. As such, the device 205 may capture an image of the physical environment (e.g., the scene 220, the target object 225) based on the emitted visible light and the estimated exposure settings. Additionally or alternatively, the device 205 may compare the estimated exposure settings to default exposure settings and configure the device 205 with the estimated one or more exposure settings based on the comparison. As a result, the device 205 may capture an image of the physical environment (e.g., the scene 220, the target object 225) based on the configuration of the device 205.

The device 205 may determine an illumination level associated with the physical environment (e.g., the scene 220, the target object 225) based on the emitted infrared light. In an example, the device 205 may determine a distance between the device 205 and the target object 225 based on the time-of-flight information 240. In some examples, the device 205 may enable the light source 210-a based on the illumination level and the distance between the device 205 and the target object 225. As a result, the device 205 may capture an image of the physical environment (e.g., the scene 220, the target object 225) based on the illumination level and the distance between the device 205 and the target object 225. Generally, the device 205 may employ aspects of the described techniques using any spectrum of light. That is, the device 205 may generally employ aspects of the described techniques using the light source 210 (e.g., an IR light, a near-IR light, an UV light) and the time-of-flight sensors 235.

Figure 3:
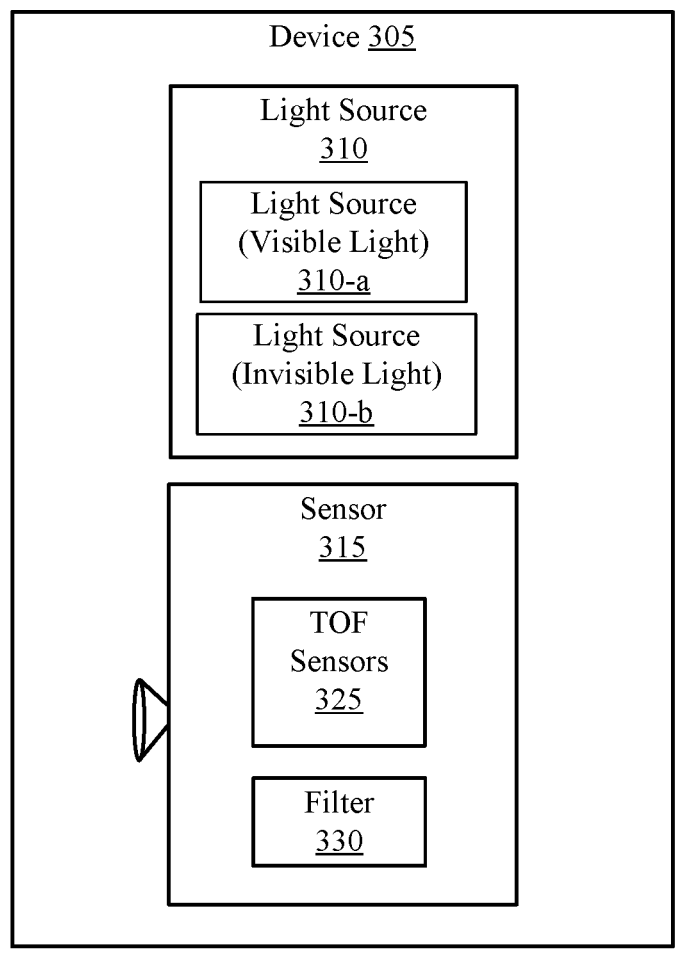
FIG. 3 illustrates a block diagram that supports infrared-assisted pre-flash in accordance with aspects of the present disclosure.

FIG. 3 illustrates a block diagram 300 of a device 305 that supports infrared-assisted pre-flash in accordance with aspects of the present disclosure. The device 305 may be an example of aspects of a device 105 and a device 205 as described herein. For example, the device 305 may be any suitable device capable of capturing images or video including, for example, wired and wireless communication devices (such as camera phones, smartphones, tablets, security systems, dash cameras, laptop computers, desktop computers, automobiles, drones, aircraft, and so on), digital cameras (including still cameras, video cameras, and so on), or any other suitable device. The device 305 may, in some examples, include a light source 310 and a sensor 315.

The light source 310 may include one or more light sources capable of emitting visible light or invisible light (e.g., an IR light, a near-IR light, a UV light, an X-RAY, and other invisible wavelengths). The light source 310 may, in some examples, include a light source 310-a and a light source 310-b. The light source 310-a may be capable of emitting visible light (e.g., a light having a wavelength of about 340 nm to about 740 nm), and the light source 310-b may be capable of emitting invisible or nearly visible light (e.g., an IR light, a near-IR light, a UV light). In some examples, the device 305 may activate or trigger (e.g., turn on, strobe) the light source 310-a, the light source 310-b, or both. The light source 310 may be in communication with a controller included in the device 305, and the controller may activate or deactivate the light source 310 to emit visible light, invisible or nearly visible light. In other examples, the controller may activate or deactivate the light source 310-a and the light source 310-b jointly or separately. For example, the controller may activate or deactivate the light source 310-a and the light source 310-b simultaneously. Alternatively, the controller may activate or deactivate the light source 310-a and then the light source 310-b, or vice-versa.

The sensor 315 may include one or more time-of-flight sensors 325 and a filter 330. The sensor 315 may detect an amount or intensity of light (e.g., a light emitted by or reflected by the scene 220 or the target object 225 as described in FIG. 2). For example, the time-of-flight sensors 325 as part of the sensor 315 may include photodiodes capable of sensing light. In some examples, the time-of-flight sensors 325 may detect red-green-blue (RGB), monochrome, IR, or UV light values associated with a scene (e.g., the scene 220 or the target object 225 as described in FIG. 2). In an example, the time-of-flight sensors 325 may detect IR light values associated with a scene under various conditions. For example, the time-of-flight sensors 325 may detect IR light values associated with a scene or a target object under conditions where the scene or the target object are in a zero-lux situation (e.g., where no visible light is present) or a non-zero lux situation (e.g., where at least some of the scene is visible to the device 305). In some examples, the time-of-flight sensors 325 may, additionally or alternatively, perform facial detection or recognition operations.

The filter 330 may include one or more filter layers. In some examples, the filter layers may include an IR filter layer, a near-IR filter layer, or a UV filter layer. The filter 330 may include an IR filter layer which may prevent or reduce (e.g., filter or block) an amount of IR light from arriving at sensors (e.g., RGB pixels) in the device 305 other than the time-of-flight sensors 325. In some examples, the sensor 315 may include the time-of-flight sensors 325 for detecting IR light as described herein and detecting visible light. The filter 330 may be disposed over or in front of the time-of-flight sensors 325 for detecting visible light. In some examples, the time-of-flight sensors 325 may emit IR light.

The device 305 may include a processor (e.g., an image signal processor). In some examples, the device 305 may perform image signal processing operations (e.g., an auto exposure control operation or a white balance operation) or image capture operations (e.g., an autofocus operation) via the processor. For example, the device 305 may perform image signal processing operations based on RGB, monochrome, IR, or UV light values detected by the sensor 315 or the time-of-flight sensors 325. In some examples, the device 305 may perform aspects of auto focus, auto exposure control, or white balance. In some examples, the device 305 may activate or deactivate the light source 310 (e.g., the light source 310-*a*, the light source 310-*b*, or both) or the sensor 315 (e.g., the time-of-flight sensors 325) via a controller configured in the device 305. In some examples, the light source 310 (e.g., the light source 310-*a*, light source 310-*b*, or both) and the sensor 315 (e.g., the time-of-flight sensors 325, the filter 330) may be configured within a footprint of the device 305.

In some examples, the device 305 may be configured to perform one or more sequences for capturing an image or a sequence of images. For example, the device 305 may perform a pre-capture sequence and a main capture sequence. The pre-capture sequence may include a pre-flash sequence using any combination of the light source 310-*a* and the light source 310-*b*. The device 305 may set or adjust capture settings for the main capture sequence based on one or more measurements or calculations performed by the device 305 during or based on the pre-capture sequence. The pre-flash sequence may include activating any combination of the light source 310-*a* and the light source 310-*b* (e.g., emitting light via the light source 310-*a*, the light source 310-*b*, or both), determining exposure settings (e.g., based on the emitted light, for example, by the light source 310-*a* or the light source 310-*b* or measured light, for example, by the time-of-flight sensors 325), and setting or adjusting settings for a main capture sequence (e.g., focus settings, exposure settings, or white balance). In an example, the pre-capture sequence may include using the light source 310-*a* (e.g., visible light) and the light source 310-*b* (e.g. IR light).

The sensor 315 (e.g., the time-of-flight sensors 325) may be in electronic communication with a controller or a processor (e.g., image signal processor, image signal processing software) included within the device 305. In some examples, the sensor 315 may be in electronic communication with the controller, and the controller may be in electronic communication with the processor. The device 305 may be an example of aspects of the device 105 or the device 205. For example, the light source 310 and the sensor 315 may be examples of aspects of the light source 210 and the sensor 215 as described in FIG. 2. The device 305 may also include additional features or components not shown, for example, such as additional sensors or cameras other than the sensor 315.

The device 305 may, in some examples, determine lighting conditions associated with capturing an image of a scene or a target object (the scene 220 or the target object 225 as described in FIG. 2). In an example, the device 305 may identify a low lighting condition (e.g., 5 lux or less) and emit light from the light source 310 (e.g., emit invisible light, for example, IR light from the light source 310-*b*). The device 305 may capture an image (e.g., image data) using the sensor 315 based on the emitted light. In an example, the device 305 may capture an image based on incident light (e.g., visible light or invisible light, for example, IR light) reflected or emitted from the scene or the target object. The time-of-flight sensors 325 may emit IR light, measure IR light (e.g., detect or sense IR light), or both. In an example, time-of-flight sensors 325 may emit IR light in combination with or in place of the light source 310-*b*. In some examples, the time-of-flight sensors 325 may emit IR light of the same or a different intensity compared to IR light emitted by the light source 310-*b*. In some examples, the time-of-flight sensors 325 may emit light of a different wavelength compared to light emitted by the light source 310-*b* (e.g., the time-of-flight sensors 325 may emit IR light, the light source 310-*b* may emit UV light).

The time-of-flight sensors 325 may emit and detect IR light differently based on lighting conditions. For example, the time-of-flight sensors 325 may emit and detect IR light under zero lux conditions (e.g., no visible light is present in the scene 220 as described in FIG. 2). Alternatively or additionally, the time-of-flight sensors 325 may emit and detect IR light under non-zero lux conditions (e.g., at least some visible light is present in the scene 220, and the scene 220 or the target object 225 is at least partially visible to the sensor 315). Under one or more of the lighting conditions, the time-of-flight sensors 325 may communicate IR information (e.g., IR values, time-of-flight information based on IR values, distance information based on IR values) which the device 305 may use, for example, to determine (e.g., set or adjust) one or more settings for a main capture sequence (e.g., focus settings, exposure settings, or white balance). In some examples, the time-of-flight sensors 325 may communicate the IR information, to the controller or image signal processor of the device 305.

The device 305 may calculate one or more values from the IR information. For example, the time-of-flight sensors 325 may communicate IR information to the device 305 (e.g., a controller or processor included in the device 305), and the device 305 may calculate an average IR value based on the IR information. In other examples, the device 305 may determine image capture settings (e.g., settings for a main capture sequence, for example, focus settings, exposure settings, or white balance)) based on the IR information (e.g., IR values, time-of-flight information based on IR values, distance information based on IR values) received from the time-of-flight sensors 325.

The device 305 may perform a comparative analysis associated with the scene or the target object (the scene 220 or the target object 225 as described in FIG. 2) based on the IR values measured by the sensor 315 (e.g., the time-of-flight sensors 325). For example, the device 305 may determine (e.g., calculate) average IR values associated with the scene 220 or the target object 225 with respect to time, based on the IR values measured by the time-of-flight sensors 325. In other examples, the sensor 315 (e.g., the time-of-flight sensors 325) may determine (e.g., calculate) the average IR values with respect to time. The device 305 may, in some examples, determine (e.g., calculate) IR average values based on IR values measured by the time-of-flight sensors 325 when the light source 310-*b* is emitting IR light (e.g., is ON). In some examples, the device 305 may determine (e.g., calculate) IR average values based on IR values measured by the time-of-flight sensors 325 when the light source 310-*b* is not emitting IR light (e.g., is OFF) or is partially illumined (e.g., using 20% power). The device 305 may compare the IR average values associated with when the light source 310-*b* is emitting IR light to the IR average values associated with when the light source 310-*b* is not emitting IR light or is partially illumined. In some examples, the device 305 may determine estimated exposure settings for auto exposure control based on the comparison. In other examples, the device 305 may determine auto focus estimates based on the comparison. As such, the device 305 may control the light source 310-*b* or the time-of-flight sensors 325 to emit IR light in coordination with measuring IR values by the time-of-flight sensors 325.

Additionally or alternatively, the device 305 may perform facial recognition or facial detection operations using the sensor 315. For example, the device 305 may correlate reflectance values associated with human skin tones and invisible or nearly visible light (e.g., IR light, UV light) and reflectance values associated with human skin tones and visible light (e.g., white light). In some examples, the device 305 may narrow, learn (e.g., by machine learning), or derive heuristics associated with facial recognition or facial detection based on the reflectance values. In some examples, the device 305 may derive or adjust tunable heuristics (e.g., conservative tunable heuristics) based on the reflectance values and human skin tones and incorporate the heuristics in adjusting or pre-adjusting settings for a main capture sequence. Additionally, in some examples, the device 305 may determine or correlate reflectance values associated with different materials or colors (e.g., black leather may reflect IR light similar to reflecting light of the visible spectrum, whereas black felt may reflect a larger amount of IR light compared to light of the visible spectrum).

The device 305 may disable a main flash under daylight conditions. For example, during the pre-flash sequence, the device 305 may determine via the sensor 315 (e.g., time-of-flight sensors 325) a distance between a scene 220 (e.g., the target object 225 in the scene 220 as described in FIG. 2) and the device 305. In some examples, the device 305 may determine that the distance satisfies a threshold (e.g., the distance is greater than a distance threshold, for example, greater than 10 meters), the device 305 may disable the main flash (e.g., a main flash using the light source 310). In some examples, the device 305 may override a user selection of the main flash. Additionally or alternatively, the device 305 may override the main flash based on an illumination level associated with the scene (e.g., the target object 225 in the scene 220 as described in FIG. 2).

In an example, the device 305 may determine via the sensor 315 (e.g., sensors other than time-of-flight sensors 325) an illumination level of visible light associated with the scene 220 (e.g., the target object 225 in the scene 220 as described in FIG. 2). In a case where the device 305 determines that the illumination level of visible light satisfies a threshold (e.g., the illumination level of visible light is greater than an illumination threshold), the device 305 may disable the main flash (e.g., the main flash using light source 310). For example, during daylight conditions, visible light may illuminate the scene 220 or the target object 225, and in some examples, the device 305 may determine (e.g., estimate) the intensity (e.g., illuminance, irradiance) of visible light radiating from the scene 220 or the target object 225 due to the daylight conditions (e.g., sunlight) is greater than an illumination threshold. In some examples, the device 305 may determine the intensity based on an inverse relationship between the intensity (e.g., illuminance, irradiance) of light or other linear waves radiating from a point source on the scene 220 or the target object 225 and the square of the distance between the device 305 and the point on the scene 220 or the target object 225. In some examples, the device 305 may determine energy per unit of area perpendicular to the point source.

Accordingly, the device 305 may determine distance information indicating the distance between the target object 225 and the device 305, based on the determined (e.g., estimated) intensity. In some examples, the device 305 may determine from the distance information that the amount of visible light which would be reflected to the device 305 (e.g., sensor 315) by the scene 220 or the target object 225 due to visible light emitted by a pre-flash (e.g., using light source 310-a) would exceed an illumination threshold. Accordingly, the device 305 may disable the main flash (e.g., a main flash using light source 310) based on the distance information (e.g., as determined based on the determined intensity). Thus, by using the time-of-flight information to determine the set of capture settings before a pre-flash, the device 305 may reduce the amount of time needed for the pre-flash.

Figure 4A:
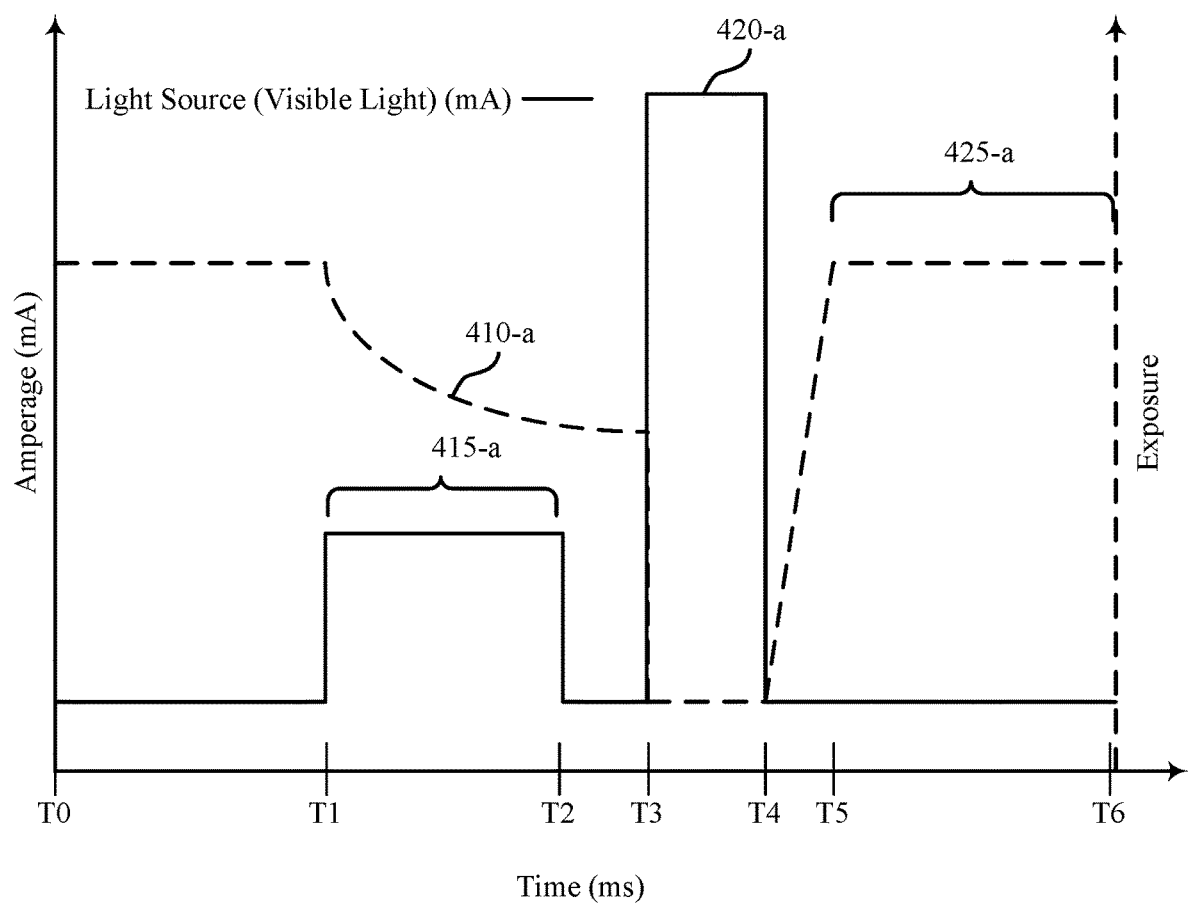
FIG. 4A is a graph illustrating a flash sequence in accordance with aspects of the present disclosure.
Figure 4B:
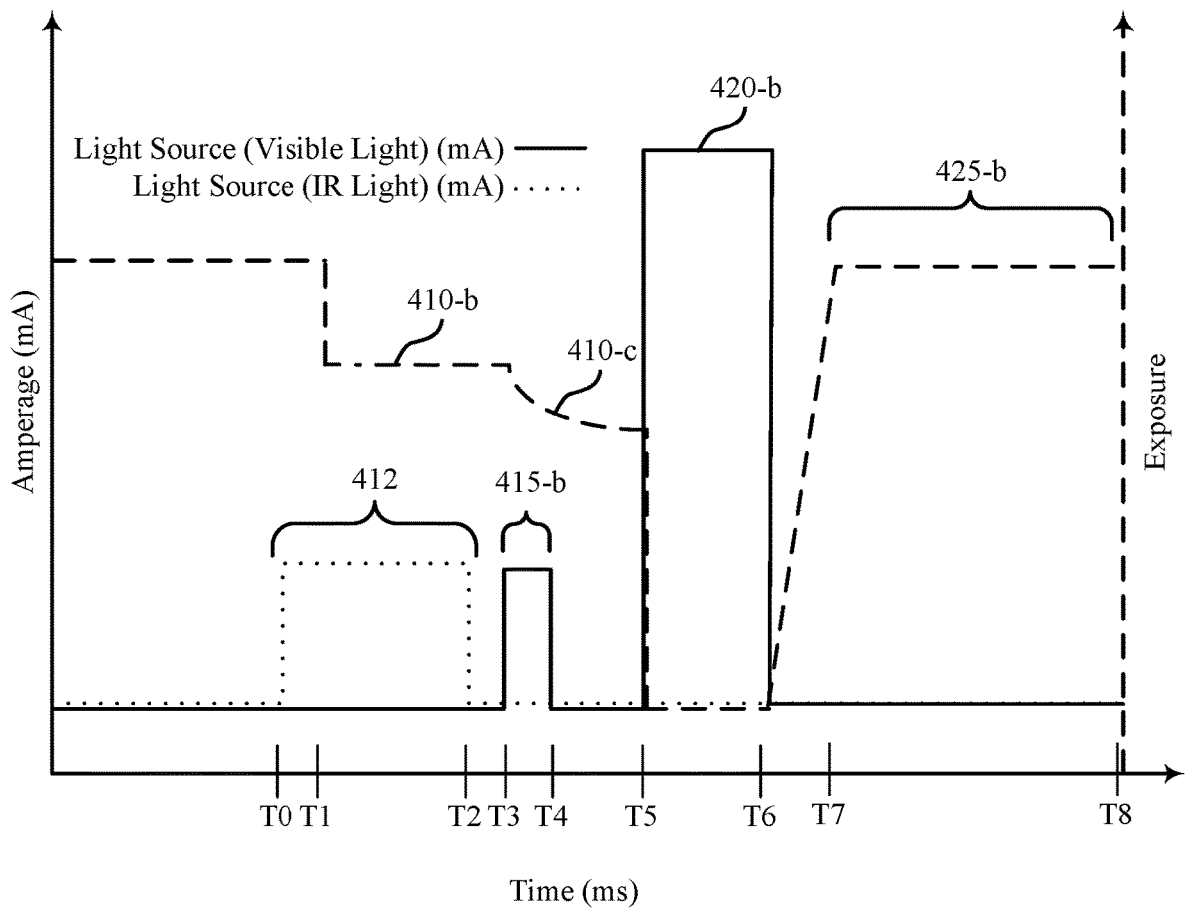
FIG. 4B is a graph illustrating a flash sequence that supports infrared-assisted pre-flash in accordance with aspects of the present disclosure.

FIG. 4A is a graph illustrating a flash sequence 400-a in accordance with aspects of the present disclosure. FIG. 4B is a graph illustrating a flash sequence 400-b that supports infrared-assisted pre-flash in accordance with aspects of the present disclosure. With reference to FIG. 4A, the graph illustrates milliamperage (mA) over time (ms) (indicated by a solid line) for a visible light source, as well as an exposure value over time (ms) (indicated by dashed lines). With reference to FIG. 4B, the graph illustrates milliamperage (mA) over time (ms) for a visible light source (indicated by a solid line), milliamperage (mA) over time (ms) for an IR light source (indicated by dotted lines), and an exposure value over time (ms) (indicated by dashed lines). In some examples, the flash sequence 400-b may implement aspects of the multimedia systems 100 and 200. In some examples, the flash sequence 400-b may be implemented by aspects of the device 105, the device 205, or the device 305 as described in FIGS. 1 through 3.

In the flash sequence 400-a of FIG. 4A, at time point T1, some devices may initiate a pre-flash sequence (e.g., emit visible light via a pre-flash 415-a). During the pre-flash sequence (e.g., from time point T1 to time point T2), some devices may adjust exposure settings (e.g., as indicated by the curve 410-a) based on light (e.g., the pre-flash 415-a) emitted from the visible light source. For example, some devices performing the pre-flash sequence may adjust exposure settings (e.g., by auto exposure control (AEC)) due to light (e.g., from the pre-flash 415-a) reflected back to the device by a target object. In some devices, due to the adjustment based on the pre-flash, exposure may be saturated before an image is captured. Visible light associated with the pre-flash 415-a may be emitted at relatively low power compared to a main flash 420-a.

The pre-flash sequence may end at time point T2. At the end of the pre-flash sequence (e.g., at time point T2), some devices (e.g., AEC) may determine exposure settings for the main flash 420-a. In some devices, AEC convergence may be 15 frames or more. At time point T3, some devices may enable the main flash 420-a (e.g., from time point T3 to time point T4), during which the devices may determine exposure settings not determined during the pre-flash sequence. Accordingly, some devices may capture an image frame with flash exposure at a maximum flash power level. Following the main flash 420-a, some devices may return to preview exposure levels (e.g., exposure levels without pre-flash or main flash), adjusting the exposure level beginning at time point T4 and reaching the preview exposure levels at time point T5. For example, after the main flash 420-a is disabled, exposure levels may return to high exposure settings.

With reference to FIG. 1, in the example flash sequence 400-b of FIG. 4B, the device 105 may initiate a pre-capture sequence at time point T0 (e.g., from time point T0 to time point T5). For example, from time point T0 to time point T2, the device 105 may emit, via a first light emitting source of the device 105, an infrared light 412 in a physical environment (e.g., the scene 220). The first light emitting source may include, for example, the light source 210-b, light source 310-b, time-of-flight sensor 235, or time-of-flight sensor 325 of the device 105. In some examples, the device 105 may determine time-of-flight information associated with the target object 225 in the physical environment based on the emitted infrared light. For example, the device 105 may determine (e.g., via the time-of-flight sensor 235, or the time-of-flight sensor 325) time-of-flight information associated with the scene 220 or the target object 225 based on infrared light reflected back to the device 105 by the scene 220 or the target object 225 (e.g., based on the emitted infrared light 412). In some examples, the device 105 may determine the time-of-flight information between time point T1 and time point T3.

The device 105 may estimate exposure settings based on the time-of-flight information. In an example, the device 105 may estimate the exposure settings based on the emitted infrared light 412 (e.g., as indicated at time point T1 by the change in exposure values at 410-*b*). In another example, the device 105 may estimate the exposure settings between time point T1 and time point T3. In some examples, the device 105 may compare the estimated exposure settings to default exposure settings and configure the device 105 with the estimated exposure settings based on the comparing. In some examples, the device 105 may capture an image of the physical environment based on the configuration.

In some examples, the device 105 may initiate a pre-flash sequence at time point T3. The pre-flash sequence may be included in the pre-capture sequence. In an example, from time point T3 to time point T4, the device 105 may emit, via a second light emitting source of the device 105, a visible light (e.g., pre-flash 415-*b*) in the physical environment (e.g., the scene 220) based on the estimated exposure settings. The second light emitting source may include, for example, the light source 210-*a* or light source 310-*a* of the device 105. The device 105 may adjust one or more exposure settings (e.g., as indicated by the curve 410-*c*) based on the pre-flash 415-*b*. For example, from time point T3 to time point T5, the device 105 may adjust exposure settings based on light emitted by the pre-flash 415-*b*. In some examples, the device 105 may adjust exposure settings based on visible light which is emitted during the pre-flash sequence (e.g., the pre-flash 415-*b*, or other light sources) and reflected back to the device 105 by the scene 220 or the target object 225. In an example, from time point T3 to time point T5, the device 105 may determine (e.g., calculate, estimate) exposure settings for a main flash 420-*b* or for capturing an image of the physical environment (e.g., the scene 220, the target object 225). The exposure settings may include AEC settings.

At time point T5, for example, the device 105 may enable a main flash 420-*b* (e.g., from time point T5 to time point T6), during which the device 105 may further estimate (e.g., determine) exposure settings. In some examples, during the main flash 420-*b*, the device 105 may capture an image frame with flash exposure at a maximum flash power level. Following the main flash 420-*b*, the device 105 may return to preview exposure levels (e.g., exposure levels without pre-flash or main flash), adjusting the exposure level beginning at time point T6 and reaching preview exposure levels at time point T7 (e.g., high exposure levels).

In some examples, the device 105 may enable the first light emitting source (e.g., the light source 210-*b*, light source 310-*b*, time-of-flight sensor 235, or time-of-flight sensor 325) and emit infrared light during a first period (e.g., from time point T0 to time point T2). In some examples, the device 105 may determine a first illumination level (e.g., IR illumination) associated with the physical environment (e.g., the scene 220) based on the emitted infrared light during the first period. In some examples, the device 105 may determine the time-of-flight information associated with the scene 220 or the target object 225 based on the first illumination level.

In some examples, the device 105 may disable the first light emitting source (e.g., the light source 210-*b*, light source 310-*b*, time-of-flight sensor 235, or time-of-flight sensor 325) during a second period (e.g., from time point T2 to time point T5) different than the first period based on the first illumination level satisfying a threshold (e.g., above or below a threshold). In some examples, the device 105 may determine a second illumination level (e.g., visible light illumination) associated with the physical environment (e.g., the scene 220) based on the disabling. In some examples, the device 105 may determine the time-of-flight information associated with the target object 225 based on one or more of the first illumination level or the second illumination level.

In some examples, the device 105 may determine an illumination level (e.g., IR illumination) associated with the physical environment (e.g., the scene 220) based on emitted infrared light (e.g., emitted infrared light 412), determine a distance between the device 105 and the target object 225 based on time-of-flight information (e.g., time-of-flight information determined based on the emitted infrared light 412), and enable the second light emitting source (e.g., the light source 210-*a* or light source 310-*a*) of the device 105 based on one or more of the illumination level and the distance between the device 105 and the target object 225. The device 105 may emit visible light (e.g., pre-flash 415-*b*), via the second light emitting source of the device 105 based on the enabling.

In an example, the device 105 may pre-configure an auto focus setting of the device 105 based on one or more of the illumination level (e.g., IR illumination level) and the distance between the device 105 and the target object 225. In some examples, the device 105 may emit, via the second light emitting source (e.g., the light source 210-*a* or light source 310-*a*) of the device 105, visible light in the physical environment (e.g., the scene 220) based on the preconfigured auto focus setting.

In some examples, the device 105 may enable a third light emitting source of the device 105, based on the distance between the camera-enabled device 105 and the target object 225 in the physical environment (e.g., the scene 220) satisfying a threshold. In an example, the third light emitting source may be an additional light source 310 capable of emitting visible light, invisible light, or both. The device 105 may emit, via the third light emitting source of the device 105, a second visible light (e.g., the main flash 420-*b*) in the physical environment based on the enabling. The device 105 may capture the image of the physical environment based on the emitted second visible light.

In an example, the emitted visible light (e.g., the pre-flash 415-*b*) associated with the second light emitting source may have a lower luminance level compared to the emitted second visible light (e.g., the main flash 420-*b*) associated with the third light emitting source. In some examples, one or more of the first light emitting source, the second light emitting source, or the third light emitting source may be part of the same component of the device 105. In some examples, the device 105 may emit the visible light (e.g., the pre-flash 415-*b*) via the second light emitting source according to a first power level and emit the second visible light (e.g., the main flash 420-*b*) via the third light emitting source according to a second power level different than the first power level.

The device 105 may override the third light emitting source (e.g., the light emitting source associated with the main flash 420-*b*) based on the distance between the device 105 and the target object 225 in the physical environment (e.g., the scene 220) satisfying a threshold (e.g., distance greater than 10 meters). In some examples, the device 105 may capture an image of the physical environment based on the overriding (e.g., without using the main flash 420-*b*). In some examples, the device 105 may estimate white balance settings of the device 105 based on one or more of the emitted infrared light or the emitted visible light. In an example, the device 105 may capture the image of the physical environment based on the estimated white balance settings. The device 105 may adjust exposure settings based on visible light reflected back to the device 105 by the scene 220 or the target object 225 (e.g., based on visible light emitted by the pre-flash 415-*b* or other visible light present in the scene 220).

Figure 5:
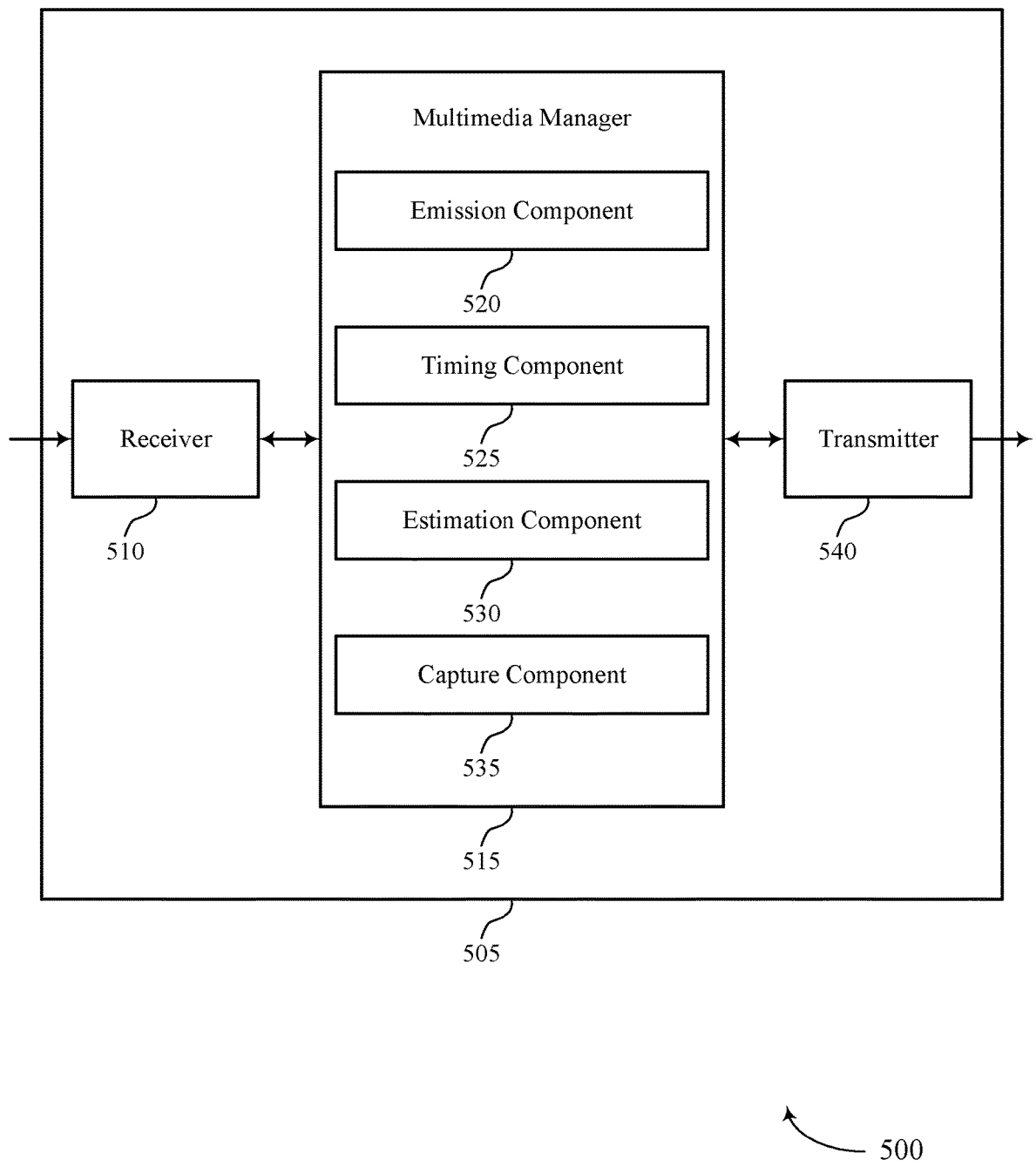
FIG. 5 shows a block diagram of a device that support infrared-assisted pre-flash in accordance with aspects of the present disclosure.

FIG. 5 shows a block diagram 500 of a device 505 that supports infrared-assisted pre-flash in accordance with aspects of the present disclosure. The device 505 may be an example of aspects of a device 105 (e.g., a camera-enabled device) as described herein. The device 505 may include a receiver 510, a multimedia manager 515, and a transmitter 540. The device 505 may also include a processor. Each of these components may be in communication with one another (e.g., via one or more buses).

The receiver 510 may receive information such as packets, user data, or control information associated with various information channels (e.g., control channels, data channels, and information related to infrared-assisted pre-flash, etc.). Information may be passed on to other components of the device 505. The receiver 510 may be an example of aspects of the transceiver 720 described with reference to FIG. 7. The receiver 510 may utilize a single antenna or a set of antennas.

The multimedia manager 515, or its sub-components, may be implemented in hardware, code (e.g., software or firmware) executed by a processor, or any combination thereof. If implemented in code executed by a processor, the functions of the multimedia manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The multimedia manager 515, or its sub-components, may be physically located at various positions, including being distributed such that portions of functions are implemented at different physical locations by one or more physical components. In some examples, the multimedia manager 515, or its sub-components, may be a separate and distinct component in accordance with various aspects of the present disclosure. In some examples, the multimedia manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The multimedia manager 515 may be an example of aspects of the multimedia manager 135 as described herein. The multimedia manager 515 may include an emission component 520, a timing component 525, an estimation component 530, and a capture component 535. The multimedia manager 515 may be an example of aspects of the multimedia manager 710 described herein.

The emission component 520 may emit, via a first light emitting source of the device 505, an infrared light in a physical environment and emit, via a second light emitting source of the 505, a visible light in the physical environment based on the estimated one or more exposure settings. The timing component 525 may determine time-of-flight information associated with a target object in the physical environment based on the emitted infrared light. The estimation component 530 may estimate one or more exposure settings based on the time-of-flight information. The capture component 535 may capture an image of the physical environment based on the emitted visible light and the estimated one or more exposure settings.

The transmitter 540 may transmit signals generated by other components of the device 505. In some examples, the transmitter 540 may be collocated with a receiver 510 in a transceiver component. For example, the transmitter 540 may be an example of aspects of the transceiver 720 described with reference to FIG. 7. The transmitter 540 may utilize a single antenna or a set of antennas.

Figure 6:
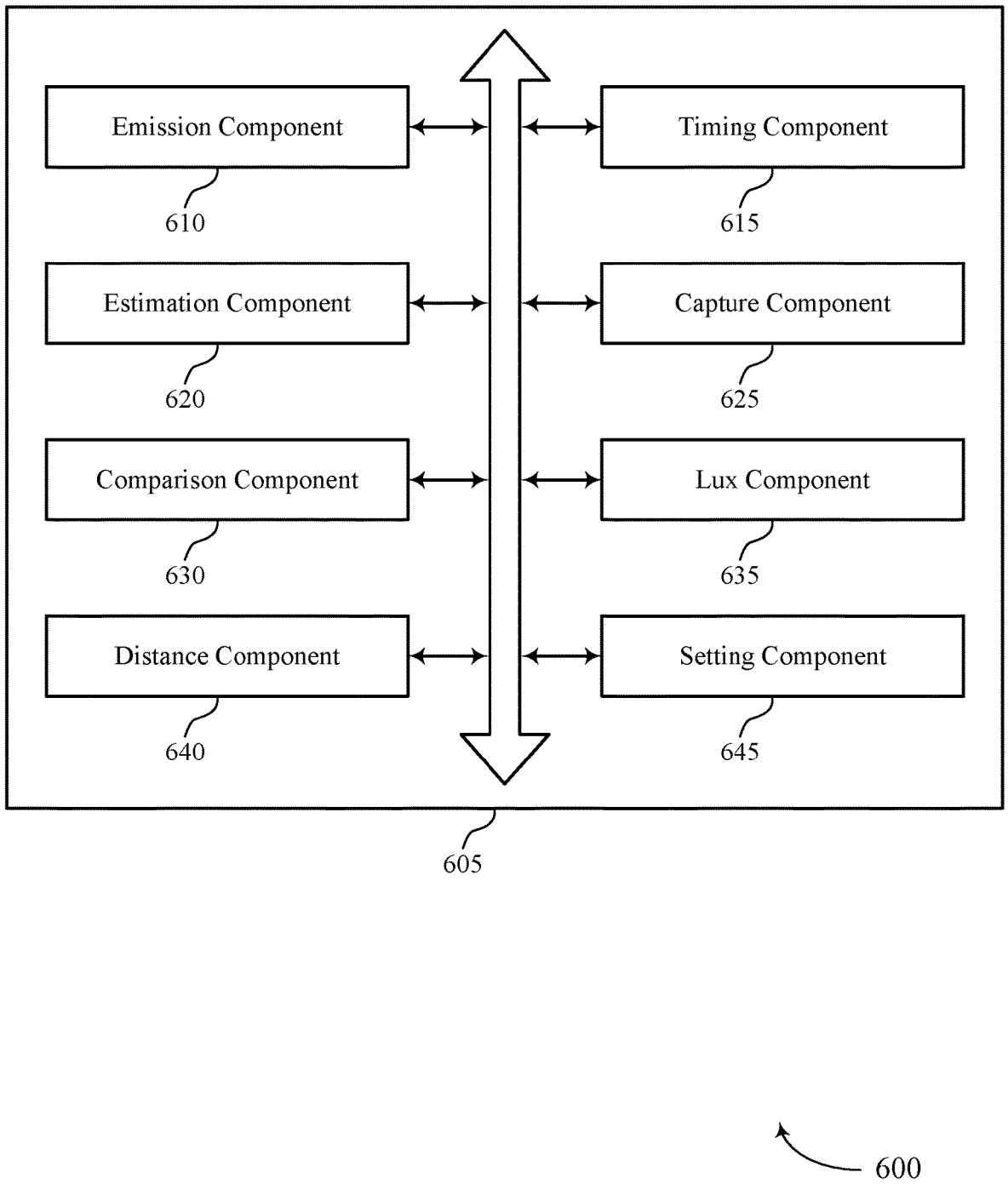
FIG. 6 shows a block diagram of a multimedia manager that supports infrared-assisted pre-flash in accordance with aspects of the present disclosure.

FIG. 6 shows a block diagram 600 of a multimedia manager 605 that supports infrared-assisted pre-flash in accordance with aspects of the present disclosure. The multimedia manager 605 may be an example of aspects of a multimedia manager 135, a multimedia manager 515, or a multimedia manager 710 described herein. The multimedia manager 605 may include an emission component 610, a timing component 615, an estimation component 620, a capture component 625, a comparison component 630, a lux component 635, a distance component 640, and a setting component 645. Each of these components may communicate, directly or indirectly, with one another (e.g., via one or more buses).

The emission component 610 may emit, via a first light emitting source of the camera-enabled device, an infrared light in a physical environment. In some examples, the emission component 610 may emit, via a second light emitting source of the camera-enabled device, a visible light in the physical environment based on the estimated one or more exposure settings. In some examples, the emission component 610 may enable the first light emitting source of the camera-enabled device during a first period, where emitting the infrared light in the physical environment is based on the enabling. In some examples, the emission component 610 may determine a first illumination level associated with the physical environment based on the emitted infrared light during the first period, where determining the time-of-flight information associated with the target object in the physical environment is further based on the first illumination level. In some examples, the emission component 610 may disable the first light emitting source of the camera-enabled device during a second period different than the first period based on the first illumination level satisfying a threshold. In some examples, the emission component 610 may determine a second illumination level associated with the physical environment based on the disabling, where determining the time-of-flight information associated with the target object in the physical environment is further based on one or more of the first illumination level or the second illumination level. In some examples, the emission component 610 may enable the second light emitting source of the camera-enabled device based on one or more of the illumination level and the distance between the camera-enabled device and the target object, where emitting, via the second light emitting source of the camera-enabled device, the visible light in the physical environment is further based on the enabling.

In some examples, the emission component 610 may enable, a third light emitting source of the camera-enabled device, based on the distance between the camera-enabled device and the target object in the physical environment satisfying a threshold. In some examples, the emission component 610 may emit, via the third light emitting source of the camera-enabled device, a second visible light in the physical environment based on the enabling, where capturing the image of the physical environment is further based on the emitted second visible light. In some examples, emitting, via the second light emitting source of the camera-enabled device, the visible light includes emitting the visible light according to a first power level. In some examples, emitting, via the third light emitting source of the camera-enabled device, the second visible light includes emitting the second visible light according to a second power level different than the first power level. In some examples, the emission component 610 may override, a third light emitting source of the camera-enabled device, based on the distance between the camera-enabled device and the target object in the physical environment satisfying a threshold, where capturing the image of the physical environment is further based on the overriding.

In some cases, the emitted visible light associated with the second light emitting source has a lower luminance level compared to the emitted second visible light associated with the third light emitting source. In some cases, one or more of the first light emitting source, the second light emitting source, or the third light emitting source are part of a same component the camera-enabled device. In some cases, one or more of the first light emitting source or the second light emitting source includes a time-of-flight sensor. In some cases, the first light emitting source and the second light emitting source are within a footprint of the camera-enabled device. In some cases, the first light emitting source and the second light emitting source are part of a same component the camera-enabled device.

The timing component 615 may determine time-of-flight information associated with a target object in the physical environment based on the emitted infrared light. The estimation component 620 may estimate one or more exposure settings based on the time-of-flight information. In some examples, the estimation component 620 may estimate one or more white balance settings of the camera-enabled device based on one or more of the emitted infrared light or the emitted visible light, where capturing the image of the physical environment is further based on the estimated one or more white balance settings. The capture component 625 may capture an image of the physical environment based on the emitted visible light and the estimated one or more exposure settings. The comparison component 630 may compare the estimated one or more exposure settings to one or more default exposure settings. In some examples, the comparison component 630 may configure the camera-enabled device with the estimated one or more exposure settings based on the comparing, where capturing the image of the physical environment is further based on configuring the camera-enabled device with the estimated one or more exposure settings.

The lux component 635 may determine an illumination level associated with the physical environment based on the emitted infrared light. The distance component 640 may determine a distance between the camera-enabled device and the target object in the physical environment based on the time-of-flight information. The setting component 645 may pre-configure an auto focus setting of the camera-enabled device based on one or more of the illumination level and the distance between the camera-enabled device and the target object, where emitting, via the second light emitting source of the camera-enabled device, the visible light in the physical environment is further based on the preconfigured auto focus setting.

Figure 7:
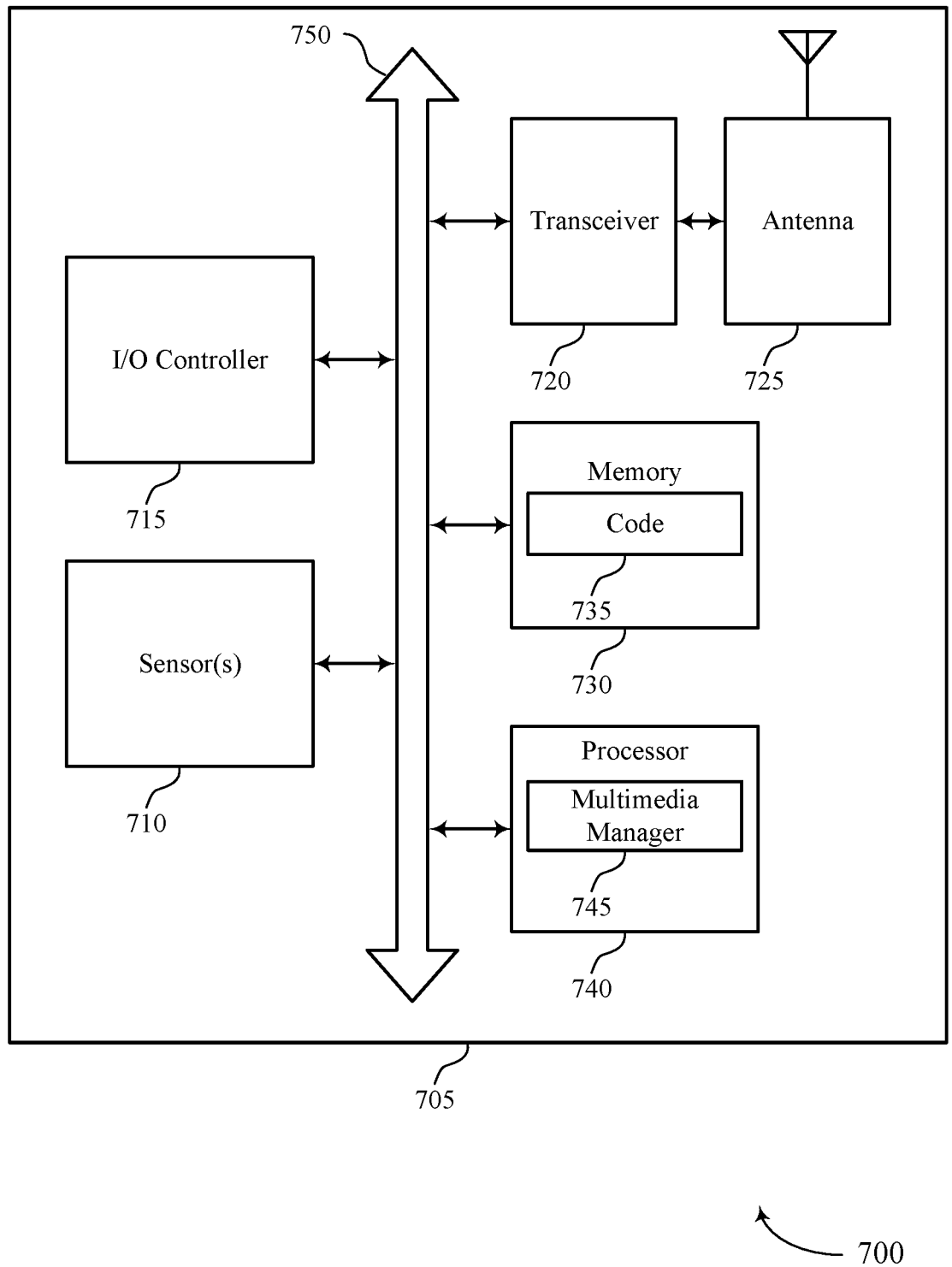
FIG. 7 shows a diagram of a system including a device that supports infrared-assisted pre-flash in accordance with aspects of the present disclosure.

FIG. 7 shows a diagram of a system 700 including a device 705 that supports infrared-assisted pre-flash in accordance with aspects of the present disclosure. The device 705 may be an example of or include the components of device 105, device 505, or a device as described herein. The device 705 may include components for bi-directional voice and data communications including components for transmitting and receiving communications, including sensor(s) 710, an I/O controller 715, a transceiver 720, an antenna 725, memory 730, and a processor 740. These components may be in electronic communication via one or more buses (e.g., bus 750).

The sensor(s) 710 may receive information such as packets, user data, or control information associated with various information channels (e.g., control channels, data channels, and information related to camera calibration, etc.). Information may be passed on to other components of the device 705. Sensor(s) 710 may be an example of an image sensor for capturing images. For example, sensor(s) 710 may represent a camera operable to capture an image of a scene alone according to aspects of the present disclosure. In another example, sensor(s) 710 may be an optical depth sensor (e.g., for determining or estimating a depth of an object or scene with respect to device 705), a lux sensor (e.g., for detecting an illumination condition, luminance levels), a motion sensor (e.g., for detecting motion associated with the scene), an infrared heat sensor (e.g., for detecting humans and animals vs. objects in the scene), among others. Sensor(s) 710 may, in some cases, be a charge coupled device (CCD) sensor or a complementary metal-oxide semiconductor (CMOS) sensor.

The I/O controller 715 may manage input and output signals for the device 705. The I/O controller 715 may also manage peripherals not integrated into the device 705. In some cases, the I/O controller 715 may represent a physical connection or port to an external peripheral. In some cases, the I/O controller 715 may utilize an operating system such as iOS, ANDROID, MS-DOS, MS-WINDOWS, OS/2, UNIX, LINUX, or another operating system. In other cases, the I/O controller 715 may represent or interact with a modem, a keyboard, a mouse, a touchscreen, or a similar device. In some cases, the I/O controller 715 may be implemented as part of a processor. In some cases, a user may interact with the device 705 via the I/O controller 715 or via hardware components controlled by the I/O controller 715.

The transceiver 720 may communicate bi-directionally, via one or more antennas, wired, or wireless links as described above. For example, the transceiver 720 may represent a wireless transceiver and may communicate bi-directionally with another wireless transceiver. The transceiver 720 may also include a modem to modulate the packets and provide the modulated packets to the antennas for transmission, and to demodulate packets received from the antennas. In some cases, the device 705 may include a single antenna 725. However, in some cases the device 705 may have more than one antenna 725, which may be capable of concurrently transmitting or receiving multiple wireless transmissions.

The memory 730 may include RAM and ROM. The memory 730 may store computer-readable, computer-executable code 735 including instructions that, when executed, cause the processor to perform various functions described herein. In some cases, the memory 730 may contain, among other things, a BIOS which may control basic hardware or software operation such as the interaction with peripheral components or devices.

The processor 740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In other cases, a memory controller may be integrated into the processor 740. The processor 740 may be configured to execute computer-readable instructions stored in a memory (e.g., the memory 730) to cause the device 705 to perform various functions (e.g., functions or tasks supporting infrared-assisted pre-flash).

The processor 740 may execute, store, and/or include the multimedia manager 745, which may emit, via a first light emitting source of the device 705, an infrared light in a physical environment, emit, via a second light emitting source of the device 705, a visible light in the physical environment based on the estimated one or more exposure settings, determine time-of-flight information associated with a target object in the physical environment based on the emitted infrared light, estimate one or more exposure settings based on the time-of-flight information, and capture an image of the physical environment based on the emitted visible light and the estimated one or more exposure settings.

As detailed above, the multimedia manager 745 and/or one or more components of the multimedia manager 745 may perform and/or be a means for performing, either alone or in combination with other elements, one or more operations for eliminating or reducing a pre-flash sequence. For example, the multimedia manager 745 or one or more components of the multimedia manager 745 described herein may perform and/or be a means for emitting, via a first light emitting source of the device 705, an infrared light in a physical environment. The multimedia manager 745 or one or more components of the multimedia manager 745 described herein may perform and/or be a means for determining time-of-flight information associated with a target object in the physical environment based at least in part on the emitted infrared light. The multimedia manager 745 or one or more components of the multimedia manager 745 described herein may perform and/or be a means for estimating one or more exposure settings based at least in part on the time-of-flight information. The multimedia manager 745 or one or more components of the multimedia manager 745 described herein may perform and/or be a means for emitting, via a second light emitting source of the device 705, a visible light in the physical environment based at least in part on the estimated one or more exposure settings. The multimedia manager 745 or one or more components of the multimedia manager 745 described herein may perform and/or be a means for capturing an image of the physical environment based at least in part on the emitted visible light and the estimated one or more exposure settings.

The code 735 may include instructions to implement aspects of the present disclosure, including instructions to support operating a camera-enabled device. The code 735 may be stored in a non-transitory computer-readable medium such as system memory or other type of memory. In some cases, the code 735 may not be directly executable by the processor 740 but may cause a computer (e.g., when compiled and executed) to perform functions described herein.

Figure 8:
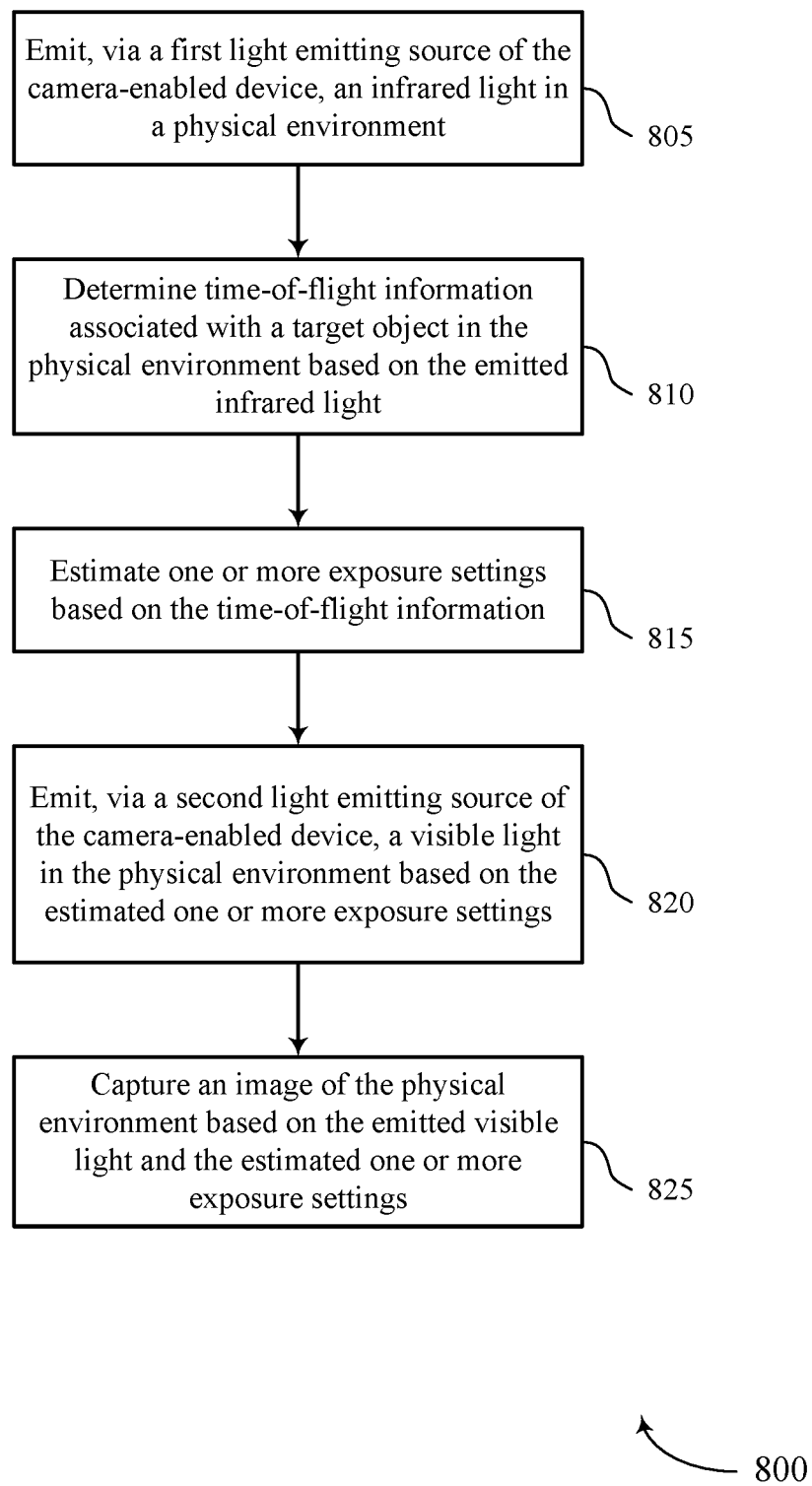
FIGS. 8 through 10 show flowcharts illustrating methods that support infrared-assisted pre-flash in accordance with aspects of the present disclosure.

FIG. 8 shows a flowchart illustrating a method 800 that supports infrared-assisted pre-flash in accordance with aspects of the present disclosure. The operations of method 800 may be implemented by a camera-enabled device (e.g., the devices 105) or its components as described herein. For example, the operations of method 800 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 805, the camera-enabled device may emit, via a first light emitting source of the camera-enabled device, an infrared light in a physical environment. The operations of 805 may be performed according to the methods described herein. In some examples, aspects of the operations of 805 may be performed by an emission component as described with reference to FIGS. 5 through 7.

At 810, the camera-enabled device may determine time-of-flight information associated with a target object in the physical environment based on the emitted infrared light. The operations of 810 may be performed according to the methods described herein. In some examples, aspects of the operations of 810 may be performed by a timing component as described with reference to FIGS. 5 through 7.

At 815, the camera-enabled device may estimate one or more exposure settings based on the time-of-flight information. The operations of 815 may be performed according to the methods described herein. In some examples, aspects of the operations of 815 may be performed by an estimation component as described with reference to FIGS. 5 through 7.

At 820, the camera-enabled device may emit, via a second light emitting source of the camera-enabled device, a visible light in the physical environment based on the estimated one or more exposure settings. The operations of 820 may be performed according to the methods described herein. In some examples, aspects of the operations of 820 may be performed by an emission component as described with reference to FIGS. 5 through 7.

At 825, the camera-enabled device may capture an image of the physical environment based on the emitted visible light and the estimated one or more exposure settings. The operations of 825 may be performed according to the methods described herein. In some examples, aspects of the operations of 825 may be performed by a capture component as described with reference to FIGS. 5 through 7.

Figure 9:
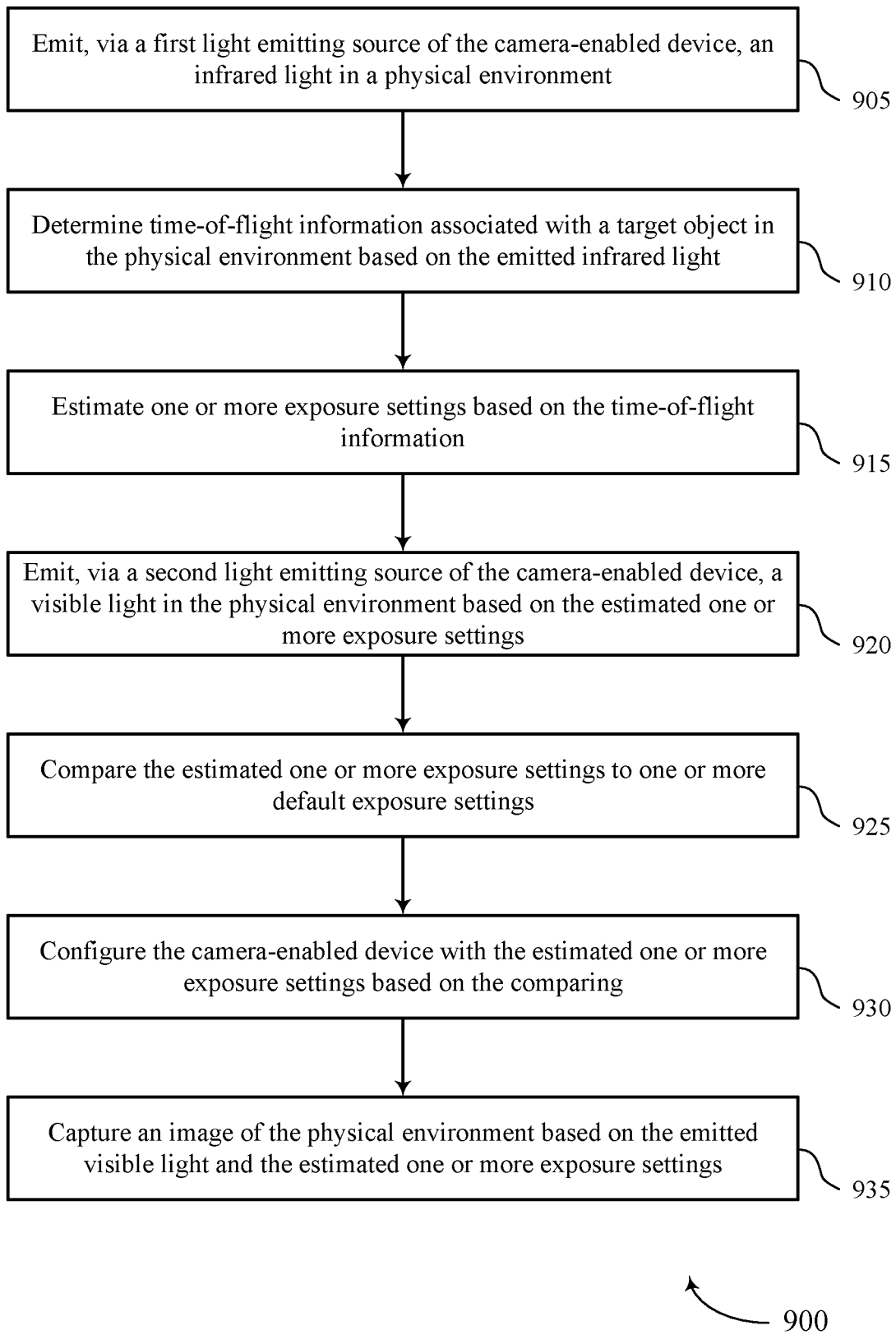

FIG. 9 shows a flowchart illustrating a method 900 that supports infrared-assisted pre-flash in accordance with aspects of the present disclosure. The operations of method 900 may be implemented by a camera-enabled device (e.g., the devices 105) or its components as described herein. For example, the operations of method 900 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 905, the camera-enabled device may emit, via a first light emitting source of the camera-enabled device, an infrared light in a physical environment. The operations of 905 may be performed according to the methods described herein. In some examples, aspects of the operations of 905 may be performed by an emission component as described with reference to FIGS. 5 through 7.

At 910, the camera-enabled device may determine time-of-flight information associated with a target object in the physical environment based on the emitted infrared light. The operations of 910 may be performed according to the methods described herein. In some examples, aspects of the operations of 910 may be performed by a timing component as described with reference to FIGS. 5 through 7.

At 915, the camera-enabled device may estimate one or more exposure settings based on the time-of-flight information. The operations of 915 may be performed according to the methods described herein. In some examples, aspects of the operations of 915 may be performed by an estimation component as described with reference to FIGS. 5 through 7.

At 920, the camera-enabled device may emit, via a second light emitting source of the camera-enabled device, a visible light in the physical environment based on the estimated one or more exposure settings. The operations of 920 may be performed according to the methods described herein. In some examples, aspects of the operations of 920 may be performed by an emission component as described with reference to FIGS. 5 through 7.

At 925, the camera-enabled device may compare the estimated one or more exposure settings to one or more default exposure settings. The operations of 925 may be performed according to the methods described herein. In some examples, aspects of the operations of 925 may be performed by a comparison component as described with reference to FIGS. 5 through 7.

At 930, the camera-enabled device may configure the camera-enabled device with the estimated one or more exposure settings based on the comparing. The operations of 930 may be performed according to the methods described herein. In some examples, aspects of the operations of 930 may be performed by a comparison component as described with reference to FIGS. 5 through 7.

At 935, the camera-enabled device may capture an image of the physical environment based on the emitted visible light and the estimated one or more exposure settings. The operations of 935 may be performed according to the methods described herein. In some examples, aspects of the operations of 935 may be performed by a capture component as described with reference to FIGS. 5 through 7.

Figure 10:
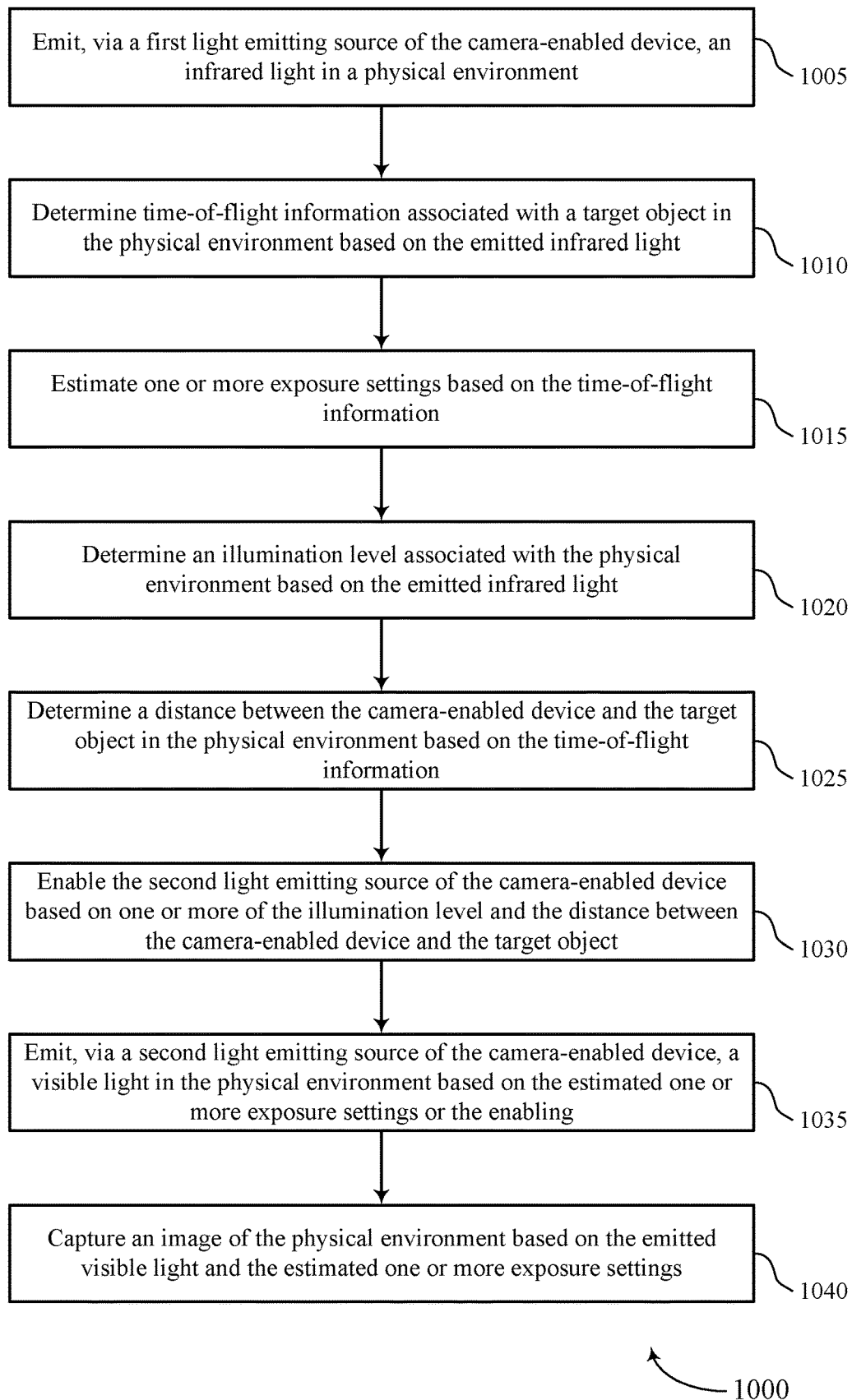

FIG. 10 shows a flowchart illustrating a method 1000 that supports infrared-assisted pre-flash in accordance with aspects of the present disclosure. The operations of method 1000 may be implemented by a camera-enabled device (e.g., the devices 105) or its components as described herein. For example, the operations of method 1000 may be performed by a multimedia manager as described with reference to FIGS. 5 through 7. In some examples, a device may execute a set of instructions to control the functional elements of the device to perform the functions described below. Additionally or alternatively, a device may perform aspects of the functions described below using special-purpose hardware.

At 1005, the camera-enabled device may emit, via a first light emitting source of the camera-enabled device, an infrared light in a physical environment. The operations of 1005 may be performed according to the methods described herein. In some examples, aspects of the operations of 1005 may be performed by an emission component as described with reference to FIGS. 5 through 7.

At 1010, the camera-enabled device may determine time-of-flight information associated with a target object in the physical environment based on the emitted infrared light. The operations of 1010 may be performed according to the methods described herein.

In some examples, aspects of the operations of 1010 may be performed by a timing component as described with reference to FIGS. 5 through 7.

At 1015, the camera-enabled device may estimate one or more exposure settings based on the time-of-flight information. The operations of 1015 may be performed according to the methods described herein. In some examples, aspects of the operations of 1015 may be performed by an estimation component as described with reference to FIGS. 5 through 7.

At 1020, the camera-enabled device may determine an illumination level associated with the physical environment based on the emitted infrared light. The operations of 1020 may be performed according to the methods described herein. In some examples, aspects of the operations of 1020 may be performed by a lux component as described with reference to FIGS. 5 through 7.

At 1025, the camera-enabled device may determine a distance between the camera-enabled device and the target object in the physical environment based on the time-of-flight information. The operations of 1025 may be performed according to the methods described herein. In some examples, aspects of the operations of 1025 may be performed by a distance component as described with reference to FIGS. 5 through 7.

At 1030, the camera-enabled device may enable the second light emitting source of the camera-enabled device based on one or more of the illumination level and the distance between the camera-enabled device and the target object. The operations of 1030 may be performed according to the methods described herein. In some examples, aspects of the operations of 1030 may be performed by an emission component as described with reference to FIGS. 5 through 7.

At 1035, the camera-enabled device may emit, via a second light emitting source of the camera-enabled device, a visible light in the physical environment based on the estimated one or more exposure settings or the enabling. The operations of 1035 may be performed according to the methods described herein. In some examples, aspects of the operations of 1035 may be performed by an emission component as described with reference to FIGS. 5 through 7.

At 1040, the device may capture an image of the physical environment based on the emitted visible light and the estimated one or more exposure settings. The operations of 1040 may be performed according to the methods described herein. In some examples, aspects of the operations of 1040 may be performed by a capture component as described with reference to FIGS. 5 through 7.

It should be noted that the methods described herein describe possible implementations, and that the operations and the steps may be rearranged or otherwise modified and that other implementations are possible. Further, aspects from two or more of the methods may be combined.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for operating a camera-enabled device, comprising:
    enabling a first light emitting source of the camera-enabled device during a first period;
    emitting, via the first light emitting source of the camera-enabled device, an infrared light in a physical environment based at least in part on the enabling;
    determining a first illumination level associated with the physical environment based at least in part on the emitted infrared light during the first period;
    disabling the first light emitting source of the camera-enabled device during a second period different than the first period based at least in part on the first illumination level satisfying a threshold;
    determining a second illumination level associated with the physical environment based at least in part on the disabling;
    determining time-of-flight information associated with a target object in the physical environment based at least in part on the emitted infrared light and on one or more of the first illumination level or the second illumination level;
    estimating one or more exposure settings based at least in part on the time-of-flight information;
    emitting, via a second light emitting source of the camera-enabled device, a visible light in the physical environment based at least in part on the estimated one or more exposure settings; and
    capturing an image of the physical environment based at least in part on the emitted visible light and the estimated one or more exposure settings, wherein the estimated one or more exposure settings are different than one or more default exposure settings associated with the emitted visible light.

2. The method of claim 1, further comprising:
comparing the estimated one or more exposure settings to the one or more default exposure settings; and
configuring the camera-enabled device with the estimated one or more exposure settings based at least in part on the comparing,
wherein capturing the image of the physical environment is further based at least in part on configuring the camera-enabled device with the estimated one or more exposure settings.

3. The method of claim 1, further comprising:
determining an illumination level associated with the physical environment based at least in part on the emitted infrared light;
determining a distance between the camera-enabled device and the target object in the physical environment based at least in part on the time-of-flight information; and
enabling the second light emitting source of the camera-enabled device based at least in part on one or more of the illumination level and the distance between the camera-enabled device and the target object,
wherein emitting, via the second light emitting source of the camera-enabled device, the visible light in the physical environment is further based at least in part on the enabling.

4. The method of claim 3, further comprising:
pre-configuring an auto focus setting of the camera-enabled device based at least in part on one or more of the illumination level and the distance between the camera-enabled device and the target object,
wherein emitting, via the second light emitting source of the camera-enabled device, the visible light in the physical environment is further based at least in part on the preconfigured auto focus setting.

5. The method of claim 3, further comprising:
enabling, a third light emitting source of the camera-enabled device, based at least in part on the distance between the camera-enabled device and the target object in the physical environment satisfying a threshold; and
emitting, via the third light emitting source of the camera-enabled device, a second visible light in the physical environment based at least in part on the enabling,
wherein capturing the image of the physical environment is further based at least in part on the emitted second visible light.

6. The method of claim 5, wherein the emitted visible light associated with the second light emitting source has a lower luminance level compared to the emitted second visible light associated with the third light emitting source.

7. The method of claim 5, wherein one or more of the first light emitting source, the second light emitting source, or the third light emitting source are part of a same component the camera-enabled device.

8. The method of claim 5, wherein emitting, via the second light emitting source of the camera-enabled device, the visible light comprises:
emitting the visible light according to a first power level.

9. The method of claim 8, wherein emitting, via the third light emitting source of the camera-enabled device, the second visible light comprises:
emitting the second visible light according to a second power level different than the first power level.

10. The method of claim 3, further comprising:
overriding, a third light emitting source of the camera-enabled device, based at least in part on the distance between the camera-enabled device and the target object in the physical environment satisfying a threshold,
wherein capturing the image of the physical environment is further based at least in part on the overriding.

11. The method of claim 1, further comprising:
estimating one or more white balance settings of the camera-enabled device based at least in part on one or more of the emitted infrared light or the emitted visible light,
wherein capturing the image of the physical environment is further based at least in part on the estimated one or more white balance settings.

12. The method of claim 1, wherein one or more of the first light emitting source or the second light emitting source comprises a time-of-flight sensor.

13. The method of claim 1, wherein the first light emitting source and the second light emitting source are within a footprint of the camera-enabled device.

14. The method of claim 1, wherein the first light emitting source and the second light emitting source are part of a same component of the camera-enabled device.

15. An apparatus, comprising:
a processor,
memory coupled with the processor; and
instructions stored in the memory and executable by the processor to cause the apparatus to:
enable a first light emitting source of the apparatus during a first period;
emit, via a first light emitting source of the apparatus, an infrared light in a physical environment based at least in part on enabling the first light emitting source;
determine a first illumination level associated with the physical environment based at least in part on the emitted infrared light during the first period;
disable the first light emitting source of the apparatus during a second period different than the first period based at least in part on the first illumination level satisfying a threshold;
determine a second illumination level associated with the physical environment based at least in part on the disabling;
determine time-of-flight information associated with a target object in the physical environment based at least in part on the emitted infrared light and on one or more of the first illumination level or the second illumination level;
estimate one or more exposure settings based at least in part on the time-of-flight information;
emit, via a second light emitting source of the apparatus, a visible light in the physical environment based at least in part on the estimated one or more exposure settings; and
capture an image of the physical environment based at least in part on the emitted visible light and the estimated one or more exposure settings, wherein the estimated one or more exposure settings are different than one or more default exposure settings associated with the emitted visible light.

16. The apparatus of claim 15, wherein the instructions are further executable by the processor to cause the apparatus to:
compare the estimated one or more exposure settings to the one or more default exposure settings; and
configure the apparatus with the estimated one or more exposure settings based at least in part on the comparing, wherein the instructions to capture the image of the physical environment are further executable by the processor based at least in part on configuring the apparatus with the estimated one or more exposure settings.

17. An apparatus, comprising:
means for enabling a first light emitting source of the apparatus during a first period;
means for emitting, via a first light emitting source of the apparatus, an infrared light in a physical environment;
means for determining a first illumination level associated with the physical environment based at least in part on the emitted infrared light during the first period;
means for disabling the first light emitting source of the apparatus during a second period different than the first period based at least in part on the first illumination level satisfying a threshold;
means for determining a second illumination level associated with the physical environment based at least in part on the disabling;
means for determining time-of-flight information associated with a target object in the physical environment based at least in part on the emitted infrared light and on one or more of the first illumination level or the second illumination level;
means for estimating one or more exposure settings based at least in part on the time-of-flight information;
means for emitting, via a second light emitting source of the apparatus, a visible light in the physical environment based at least in part on the estimated one or more exposure settings; and
means for capturing an image of the physical environment based at least in part on the emitted visible light and the estimated one or more exposure settings, wherein the estimated one or more exposure settings are different than one or more default exposure settings associated with the emitted visible light.

18. The apparatus of claim 15, wherein the instructions are further executable by the processor to cause the apparatus to:
determine an illumination level associated with the physical environment based at least in part on the emitted infrared light;
determine a distance between the camera-enabled device and the target object in the physical environment based at least in part on the time-of-flight information; and
enable the second light emitting source of the camera-enabled device based at least in part on one or more of the illumination level and the distance between the camera-enabled device and the target object,
wherein the instructions for emitting, via the second light emitting source of the camera-enabled device, the visible light in the physical environment instructions are further executable by the processor based at least in part on the enabling.

19. The apparatus of claim 18, wherein the instructions are further executable by the processor to cause the apparatus to:
pre-configure an auto focus setting of the camera-enabled device based at least in part on one or more of the illumination level and the distance between the camera-enabled device and the target object,
wherein the instructions for emitting, via the second light emitting source of the camera-enabled device, the visible light in the physical environment are further executable by the processor based at least in part on the preconfigured auto focus setting.

20. The apparatus of claim 18, wherein the instructions are further executable by the processor to cause the apparatus to:
enable, a third light emitting source of the camera-enabled device, based at least in part on the distance between the camera-enabled device and the target object in the physical environment satisfying a threshold; and
emit, via the third light emitting source of the camera-enabled device, a second visible light in the physical environment based at least in part on the enabling,
wherein the instructions for capturing the image of the physical environment are further executable by the processor based at least in part on the emitted second visible light.

* * * * *